US011113758B1

(12) United States Patent
Poon et al.

(10) Patent No.: US 11,113,758 B1
(45) Date of Patent: Sep. 7, 2021

(54) USER INTERFACE FOR DOCUMENT IMAGING

(71) Applicant: Wells Fargo Bank, N.A., San Francisco, CA (US)

(72) Inventors: Derrick T. Poon, San Leandro, CA (US); Virenkumar R. Patel, Fremont, CA (US); Gregory John Hansen, El Dorado Hills, CA (US); Raissa Williams, San Francisco, CA (US); Leah M. Pineda, San Francisco, CA (US); Karen Teats Morrison, York, PA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 414 days.

(21) Appl. No.: 15/983,651

(22) Filed: May 18, 2018

Related U.S. Application Data

(60) Provisional application No. 62/508,588, filed on May 19, 2017.

(51) Int. Cl.
*G06Q 40/02* (2012.01)
*G06F 3/0481* (2013.01)
(Continued)

(52) U.S. Cl.
CPC .......... *G06Q 40/02* (2013.01); *G06F 3/0482* (2013.01); *G06F 3/0488* (2013.01);
(Continued)

(58) Field of Classification Search
USPC .................................................... 705/35, 39
See application file for complete search history.

(56) References Cited

U.S. PATENT DOCUMENTS 6,370,266 B1    4/2002   Lau et al.
6,654,487 B1    11/2003  Downs, Jr.
(Continued)

OTHER PUBLICATIONS

Imaging IT: A Second Look , While financial services firms are leaders in the automation of document management, providers of imaging technology say their applications can do much, much more today. Rountree, David. Bank Technology News 14.10: 35-36. SourceMedia. (Oct. 2001) (Year: 2001).*

(Continued)

*Primary Examiner* — William E Rankins
(74) *Attorney, Agent, or Firm* — Schwegman Lundberg & Woessner, P.A.

(57) ABSTRACT

Various examples are directed to systems and methods for facilitating image-based financial transactions. A computing device may display a multi-mode launch icon that is alternately selectable by a user in a first mode and in a second mode. The computing device may detect a first user input that selects the launch icon in the first mode and, in response, execute a first application. The computing device may also detect a second user input that selects the launch icon in the second mode and, in response, prompt the user to capture an image of a document with an imaging device. The computing device may determine, based at least in part on the image, that the document is of a first document type and execute a document-type routine to perform a first financial transaction based at least in part on the document.

20 Claims, 21 Drawing Sheets

(51) Int. Cl.
*G06F 3/0488* (2013.01)
*H04N 5/232* (2006.01)
*G06Q 20/38* (2012.01)
*G06F 3/0482* (2013.01)
*G06K 9/00* (2006.01)
*G06F 3/0484* (2013.01)

(52) U.S. Cl.
CPC ......... *G06F 3/04817* (2013.01); *G06Q 20/38* (2013.01); *H04N 5/23222* (2013.01); *G06F 3/04842* (2013.01); *G06K 9/00442* (2013.01)

(56) References Cited

U.S. PATENT DOCUMENTS

| | | | |
|---|---|---|---|
| 6,863,214 B2 | 3/2005 | Garner, IV et al. |
| 6,870,947 B2 | 3/2005 | Kelland |
| 6,937,752 B2 | 8/2005 | Chiba et al. |
| 7,006,664 B2 | 2/2006 | Paraskevakos |
| 7,020,320 B2 | 3/2006 | Filatov |
| 7,108,174 B2 | 9/2006 | Sellen et al. |
| 7,197,173 B2 | 3/2007 | Jones et al. |
| 7,229,012 B1 | 6/2007 | Enright et al. |
| 7,389,914 B1 | 6/2008 | Enright et al. |
| 7,391,897 B2 | 6/2008 | Jones et al. |
| 7,461,779 B2 | 12/2008 | Ramachandran |
| 7,526,117 B2 | 4/2009 | Foth |
| 7,548,641 B2 | 6/2009 | Gilson et al. |
| 7,580,873 B1 | 8/2009 | Silver et al. |
| 7,606,741 B2 | 10/2009 | King et al. |
| 7,644,043 B2 | 1/2010 | Minowa |
| 7,738,690 B2 | 6/2010 | Liu |
| 7,747,529 B2 | 6/2010 | Homoki |
| 7,748,611 B2 | 7/2010 | Carpenter et al. |
| 7,761,358 B2 | 7/2010 | Craig et al. |
| 7,778,457 B2 | 8/2010 | Nepomniachtchi et al. |
| 7,789,295 B2 | 9/2010 | Smith et al. |
| 7,819,309 B1 | 10/2010 | Warren et al. |
| 7,876,949 B1 | 1/2011 | Oakes et al. |
| 7,885,880 B1 | 2/2011 | Prasad et al. |
| 7,896,235 B2 | 3/2011 | Ramachandran |
| 7,950,698 B2 | 5/2011 | Popadic et al. |
| 7,962,411 B1 | 6/2011 | Prasad et al. |
| 7,974,899 B1 | 7/2011 | Prasad et al. |
| 8,011,576 B2 | 9/2011 | Smith et al. |
| 8,059,881 B1 | 11/2011 | Thomas |
| 8,104,676 B2 | 1/2012 | Ramachandran |
| 8,280,143 B1 | 10/2012 | Klieman et al. |
| 8,286,867 B1 | 10/2012 | Brown et al. |
| 8,290,237 B1 | 10/2012 | Burks et al. |
| 8,326,015 B2 | 12/2012 | Nepomniachtchi |
| 8,328,091 B2 | 12/2012 | Ramachandran |
| 8,351,677 B1 | 1/2013 | Oakes et al. |
| 8,380,626 B2 | 2/2013 | Huff et al. |
| 8,396,278 B2 | 3/2013 | Jones et al. |
| 8,418,916 B2 | 4/2013 | Smith et al. |
| 8,433,127 B1 | 4/2013 | Harpel et al. |
| 8,483,473 B2 | 7/2013 | Roach et al. |
| 8,583,526 B2 | 11/2013 | Anderson et al. |
| 8,620,058 B2 | 12/2013 | Nepomniachtchi et al. |
| 8,639,016 B2 | 1/2014 | Frew |
| 8,660,984 B1 | 2/2014 | Bhattacharyya et al. |
| 8,668,141 B2 | 3/2014 | Smith et al. |
| 8,768,038 B1 | 7/2014 | Sherman et al. |
| 8,768,836 B1 | 7/2014 | Acharya |
| 8,798,354 B1 | 8/2014 | Bunzel et al. |
| 8,855,377 B1 | 10/2014 | Madhani |
| 9,076,135 B2 | 7/2015 | Dent et al. |
| 9,195,974 B2 | 11/2015 | Narenda et al. |
| 9,292,737 B2 | 3/2016 | Nepomniachtchi et al. |
| 9,305,228 B1 | 4/2016 | Williams |
| 9,406,053 B2 | 8/2016 | Vigue |
| 9,465,682 B1 | 10/2016 | Powell |
| 9,501,706 B2 | 11/2016 | Williams et al. |
| 9,519,893 B2 | 12/2016 | Williams |
| 10,643,191 B2 * | 5/2020 | Jurss .................... G06Q 20/108 |
| 2002/0196479 A1 * | 12/2002 | Simske ............. H04N 1/00795 358/474 |
| 2004/0143547 A1 * | 7/2004 | Mersky .................. G06Q 10/10 705/40 |
| 2004/0262378 A1 * | 12/2004 | Ooki .................... H04N 1/6072 235/375 |
| 2006/0215194 A1 * | 9/2006 | Gotoh ...................... H04N 1/60 358/1.9 |
| 2006/0231736 A1 * | 10/2006 | Matsuda ............ H04N 1/32101 250/208.1 |
| 2010/0058180 A1 * | 3/2010 | Hirayama .......... H04N 1/00482 715/274 |
| 2012/0179609 A1 * | 7/2012 | Agarwal .............. G06Q 20/042 705/44 |
| 2012/0221446 A1 * | 8/2012 | Grigg .................... G06Q 40/02 705/30 |
| 2012/0292388 A1 * | 11/2012 | Hernandez ......... G06Q 20/3276 235/379 |
| 2014/0188715 A1 * | 7/2014 | Barlok ................. G06Q 20/102 705/40 |
| 2014/0240245 A1 * | 8/2014 | Kim ........................ G06F 3/013 345/173 |
| 2015/0032631 A1 | 1/2015 | Hinski |
| 2015/0154644 A1 | 6/2015 | Saxena et al. |
| 2015/0379152 A1 | 12/2015 | Bentley et al. |
| 2016/0147386 A1 * | 5/2016 | Han ...................... G06F 40/279 715/838 |
| 2016/0180165 A1 | 6/2016 | Smith et al. |
| 2016/0203364 A1 | 7/2016 | Nepomniachtchi et al. |
| 2017/0031874 A1 | 2/2017 | Boudville |
| 2017/0161709 A1 * | 6/2017 | Tunnell ................. G06Q 20/20 |
| 2018/0167440 A1 * | 6/2018 | Rybkin .................. H04N 21/00 |

OTHER PUBLICATIONS

"The Federal Reserve PaymentsStudy 2016", A Federal Reserve System publication, (2016), 12 pgs.

* cited by examiner

USER INTERFACE FOR DOCUMENT IMAGING

CROSS-REFERENCE TO RELATED APPLICATION

This patent application claims the benefit of U.S. Provisional Patent Application No. 62/508,588, filed May 19, 2017, which is incorporated by reference herein in its entirety.

TECHNICAL FIELD

Embodiments described herein generally relate to systems and methods for interfacing a computing device with a user to facilitate document imaging BACKGROUND Many organizations still conduct business with paper. For example, the United States Federal Reserve reports that over seventeen billion paper checks were processed in the United States in 2016. Many businesses also provide paper invoices, receipts, and other similar items.

DRAWINGS

In the drawings, which are not necessarily drawn to scale, like numerals may describe similar components in different views. Like numerals having different letter suffixes may represent different instances of similar components. Some embodiments are illustrated by way of example, and not of limitation, in the figures of the accompanying drawings.

DETAILED DESCRIPTION

Figure 1:
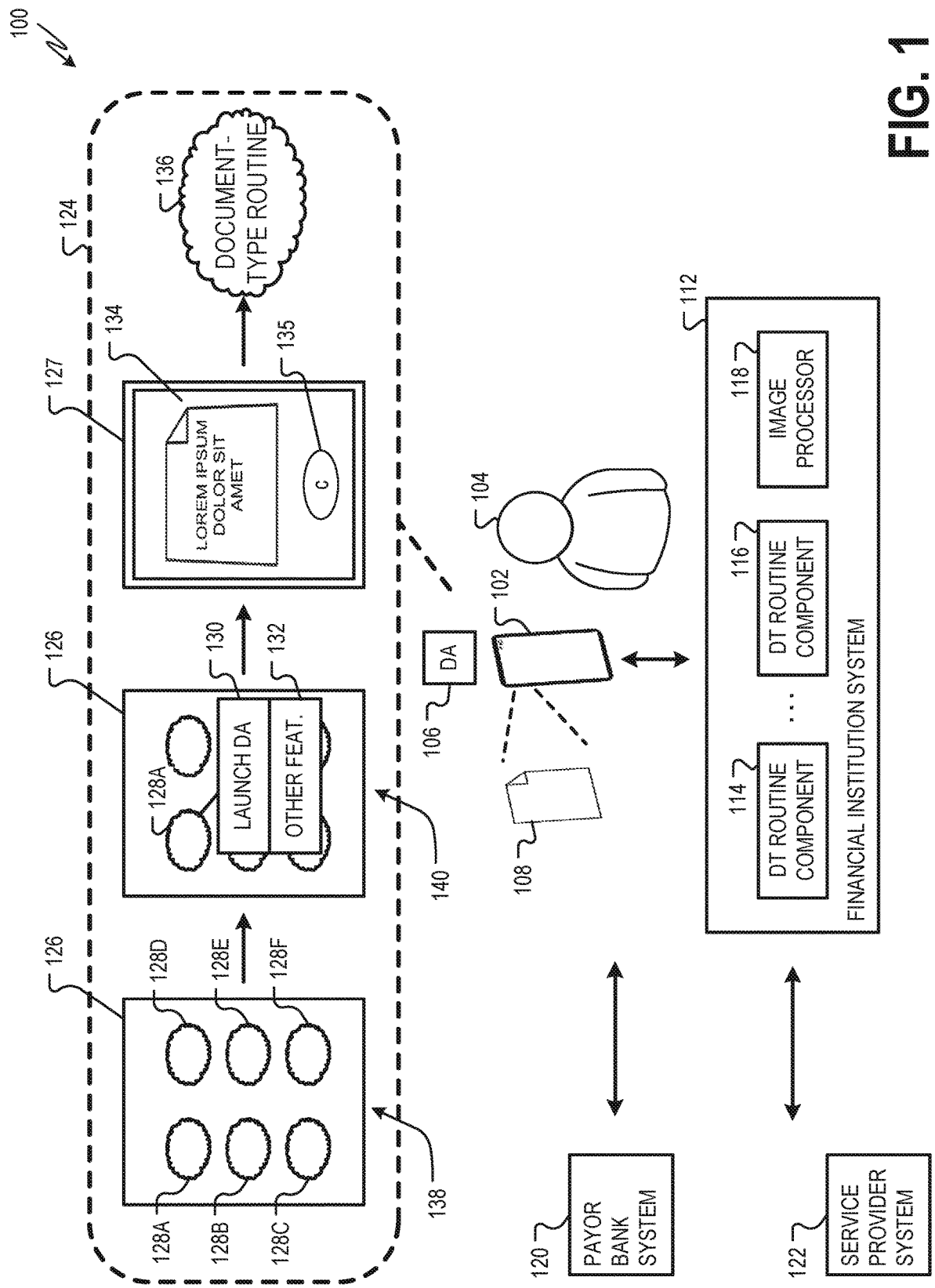
FIG. 1 is a diagram showing one example of an environment for facilitating image-based financial transactions.

User computing devices, such as tablet computing devices, mobile computing devices, laptop computing devices, etc., are used to perform image-based financial transactions. For example, a user computing device may execute a document application. When launched by a user, the document application uses a camera or other imaging device of the user computing device to capture one or more images of a document. (For example, the user may be a customer of a financial institution or other service provider that performs or facilitates financial transactions.)

The document application extracts data about the document from the captured image. The document application uses hardware of the user computing device to communicate with other systems, such as a financial institution system, to initiate a financial transaction based on the document. The type of transaction that is initiated may depend on the type of document. For example, an image of a check may be used to initiate a transaction to deposit the check to the user's account. An image of an invoice may be used to pay the invoice and/or track the invoice with an Enterprise Resource Planning (ERP) or similar system. An image of a receipt may be used to track user spending.

In some examples, a single user performs image-based transactions with different types of documents. For example, a user may both deposit a check and process a receipt (e.g., at different times). In some examples, this is accomplished with different applications. For example, the user may open one application to capture and process an image of a check and a second application to capture and process an image of a receipt. Opening different applications, however, can be cumbersome for the user. In other examples, a single application is configured to process different document types. For example, the user may launch the single application and select the type of document to be processed from a menu in the application. Although this removes the need for multiple applications on the user computing device, identifying and selecting the appropriate menu item corresponding to the user's document can be cumbersome.

In some examples, the document application is launched at the user computing device when the user selects a multi-mode launch icon. A multi-mode launch icon is an icon that can be selected by the user in multiple different modes. The user computing device differentiates between when the launch icon is selected in the first mode and when the launch icon is selected in the second mode and responds differently, depending on the selected mode. When the user selects the launch icon according to at least one mode, the document application is executed.

The document application may prompt the user to capture an image of a document. The document application may be programmed to process the image of the document to identify a document type of the depicted document and to initiate a routine that is specific to the detected document type (e.g., a document-type routine). For example, a check deposit routine may facilitate a transaction to deposit a check in an account associated with the user. A receipt routine may track the receipt as a user expense and/or correlate the receipt to a debt at the user's account, etc.

The document application, as described herein, that detects a document type of an imaged document and executes a corresponding document-type routine may provide the user with a single interface point for multiple different types of documents. This may improve the speed and efficiency of the user's interaction with the user computing device. For example, instead of accessing different applications for different document types, or navigating and selecting different menu items for different document types, the user may only need to access one menu item. Also, providing the option to launch the document application from a multi-mode launch icon may allow the user to process documents without the need to navigate various menus and identify menu options. This too may improve the speed and efficiency of the user's interaction with the user computing device.

FIG. 1 is a diagram showing one example of an environment 100 for facilitating image-based financial transactions. The environment 100 comprises a user computing device 102 of a user 104. The user computing device 102 may be any suitable type of computing device including for example, a tablet computer, a mobile computing device, a laptop computer, etc. The user computing device 102 executes a document application 106 that may operate as described herein. The user computing device 102 may be in communication with a financial institution system 112. The financial institution system 112 may be or include any suitable computing device or combination of computing devices, such as one or more servers. In some examples, all or part of the financial institution system 112 is implemented utilizing a cloud computing platform such as, for example, Amazon Web Services available from Amazon.com, Inc.; Azure, available from Microsoft Corporation; etc.

FIG. 1 also shows a workflow 124 showing a user interface screen 126 that may be provided to the user 104 via a display of the user computing device 102 to facilitate image-based financial transactions, as described herein. At an iteration 138, the user interface screen 126 includes various icons 128A, 128B, 128C, 128D, 128E, 128F. The icons 128A, 128B, 128C, 128D, 128E, 128F are selectable by the user 104 to provide input to the user computing device 102, prompt the user computing device 102 to take various actions, etc. In some examples, the user interface screen 126 is a home screen or other menu screen provided to the user 104 to enable the user 104 to select different applications such as, for example, the document application 106 described herein, a web browser application, etc.

In the example of FIG. 1, the icon 128A is a multi-mode launch icon for launching the document application 106. The user 104 may select the icon 128A according to different modes to prompt the user computing device 102 to perform different operations. In the example of FIG. 1, the user 104 selects the icon 128A by providing a user input, such as, for example, by pressing on a touchscreen in the location of the icon 128A, by moving a cursor to the location of the icon 128A, or by any other suitable user input. When the icon 128A is selected, the user computing device 102 may respond by configuring the user interface screen 126 as shown in an iteration 140. In the iteration 140, the user interface screen 126 is shown with menu items 130, 132 associated with the icon 128A. The user 104 may provide an additional user input to select one of the menu items 130, 132 to proceed. In the example of FIG. 1, two menu items 130, 132 are shown. The menu item 130, when selected by the user 104, may launch the document application 106 described herein. The menu item 132, when selected by the user 104, may launch other features. For example, the icon 128A may be associated with a financial services application that includes both the document application 106 and other applications for performing other financial tasks, such as checking an account balance, sending an inquiry regarding an account, etc. Selecting the icon 128A according to a first mode (e.g., by selecting the icon 128A and then the menu item 130) may launch the document application 106. Selecting the icon 128A according to a second mode (e.g., by selecting the icon 128A and then the menu item 132) may launch other features.

When the document application 106 launches, it may modify the display of the user computing device 102 to show an initial image capture screen 127 that prompts the user 104 to capture an image of a document 108 with the user computing device 102. For example, the user 104 may position the document 108 in front of a camera or other imaging device of the user computing device 102. The initial image capture screen 127 may include an image field 134 showing the current field-of-view of the camera. This may allow the user 104 to position the document 108 for imaging. When the document 108 is positioned in the image field 134, the user 104 may select a capture button 135 to prompt the user computing device 102 to capture an image of the document 108.

After capturing the image of the document 108, the document application 106 may extract data from the image and use the data to determine a type of the document 108. In some examples, the document application 106 executes an optical character recognition (OCR) or other similar algorithm to extract data from the image locally at the user computing device 102. In other examples, the document application 106 uses hardware of the user computing device 102 to send some or all of the captured image to the financial institution system 112 or another suitable system for processing for example, by an image processor application 118. For example, the financial institution system 112 may execute the image processor application 118 that is configured to extract document data from the image and determine a type of the document 108.

When the document type is determined, the document application 106 launches a document-type routine 136 corresponding to the determined type of the document 108. The document application 106 may launch the document-type routine 136 in any suitable manner. In some examples, the document-type routine 136 is or includes a subroutine or other component of the document application 106. Accordingly, launching the document-type routine 136 may include calling or otherwise initiating the execution of the appropriate subroutine. In some examples, the document-type routine 136 includes a separate application with instructions stored at the user computing device 102. Launching the document-type routine 136 may include launching the appropriate separate application. In some examples, all or part of the document-type routine 136 is executed at a remote system, such as the financial institution system 112. Launching the document-type routine 136 may include communicating with the financial institution system 112 and requesting that it execute an appropriate document-type routine component 114, 116.

The document-type routine 136 may execute various operations for processing the document 108 including for example, prompting the user 104 to capture additional images of the document 108, prompting the user 104 to confirm data extracted from the document 108, prompting the user 104 to confirm a financial transaction to be performed from the document 108, requesting a financial transaction based on the document 108, etc.

One example of a document-type routine is a check deposit routine for executing when the document 108 is a check. A check deposit routine may deposit the check, for example, to an account of the user 104. Another example of a document-type routine is a receipt routine for executing when the document 108 is a receipt. A receipt routine may perform various operations including for example, reconciling a receipt to a debit on an account of the user 104, generating an expense report, etc. Yet another example of a document-type routine is an invoice routine for executing when the document 108 is an invoice. An invoice routine may prompt the user 104 to pay the invoice, for example, from a deposit and/or credit account. Another example document-type routine is a check register routine for executing when the document 108 is a user-executed check or a check register. A check register routine may store data describing the user-executed check or check register to compare to checks presented for payment.

Different document-type routines 136 may be executed locally at the user computing device 102 or, in some examples, may be executed at the financial institution system 112. For example, the financial institution system 112 may execute one or more document-type routine components 114, 116 in conjunction with the user computing device 102.

Some operations of document-type routines may include communicating with various other systems, such as a pay or bank system 120, or another service provider system 122. For example, a check deposit routine may include operations in which the user computing device 102 and/or financial institution system 112 communicates with the payor bank system 120, for example, to present the check for payment. The service provider system 122 may provide various document-type routine services to the financial institution system 112 and/or user computing device 102. In some examples, the service provider system 122 is or includes a business service system such as an ERP system for managing expenses, invoices, accounts receivable, etc.

Figure 2:
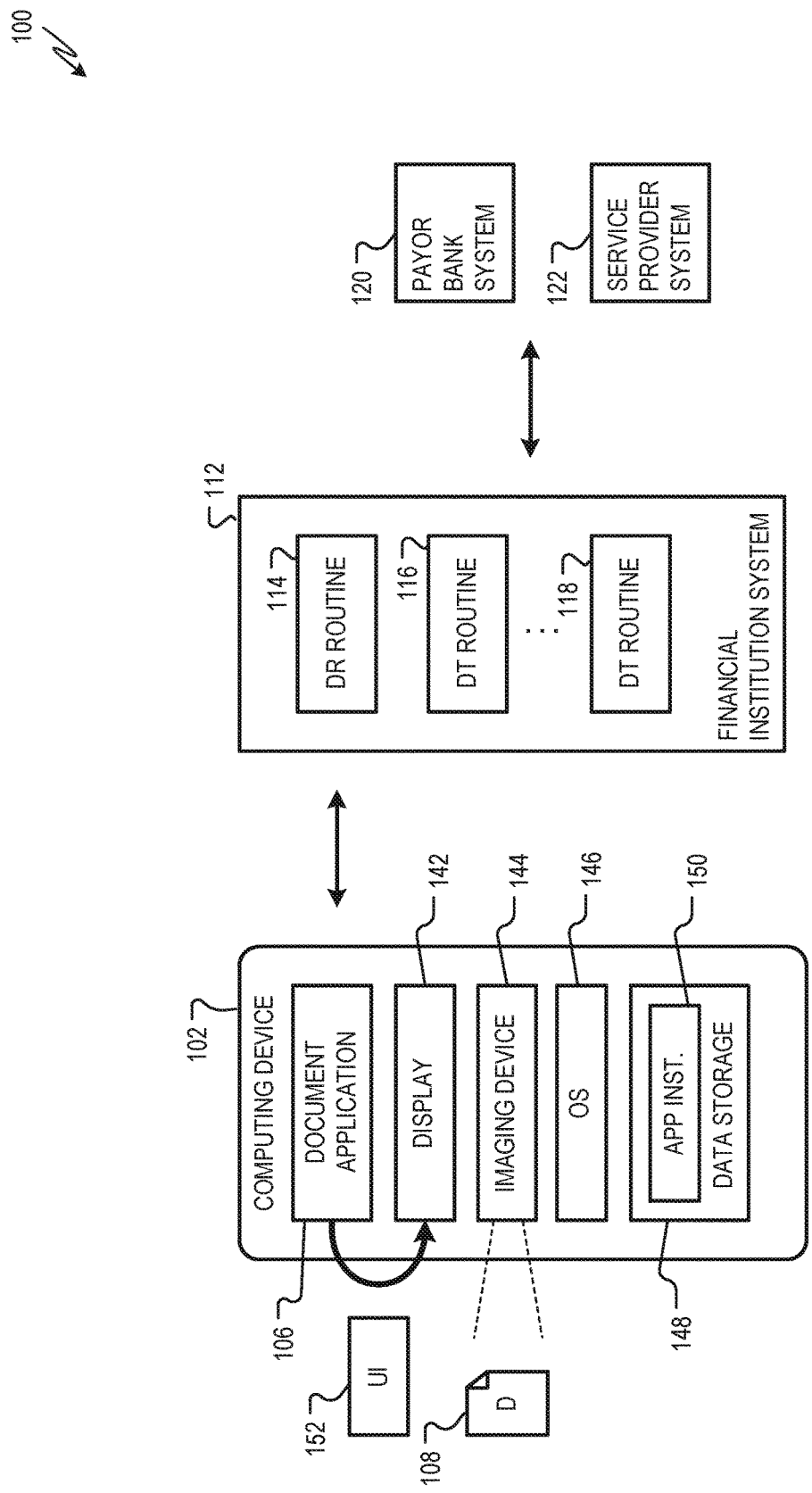
FIG. 2 is a diagram showing one example of the environment including additional details of a user computing device of FIG. 1.
Figure 24:
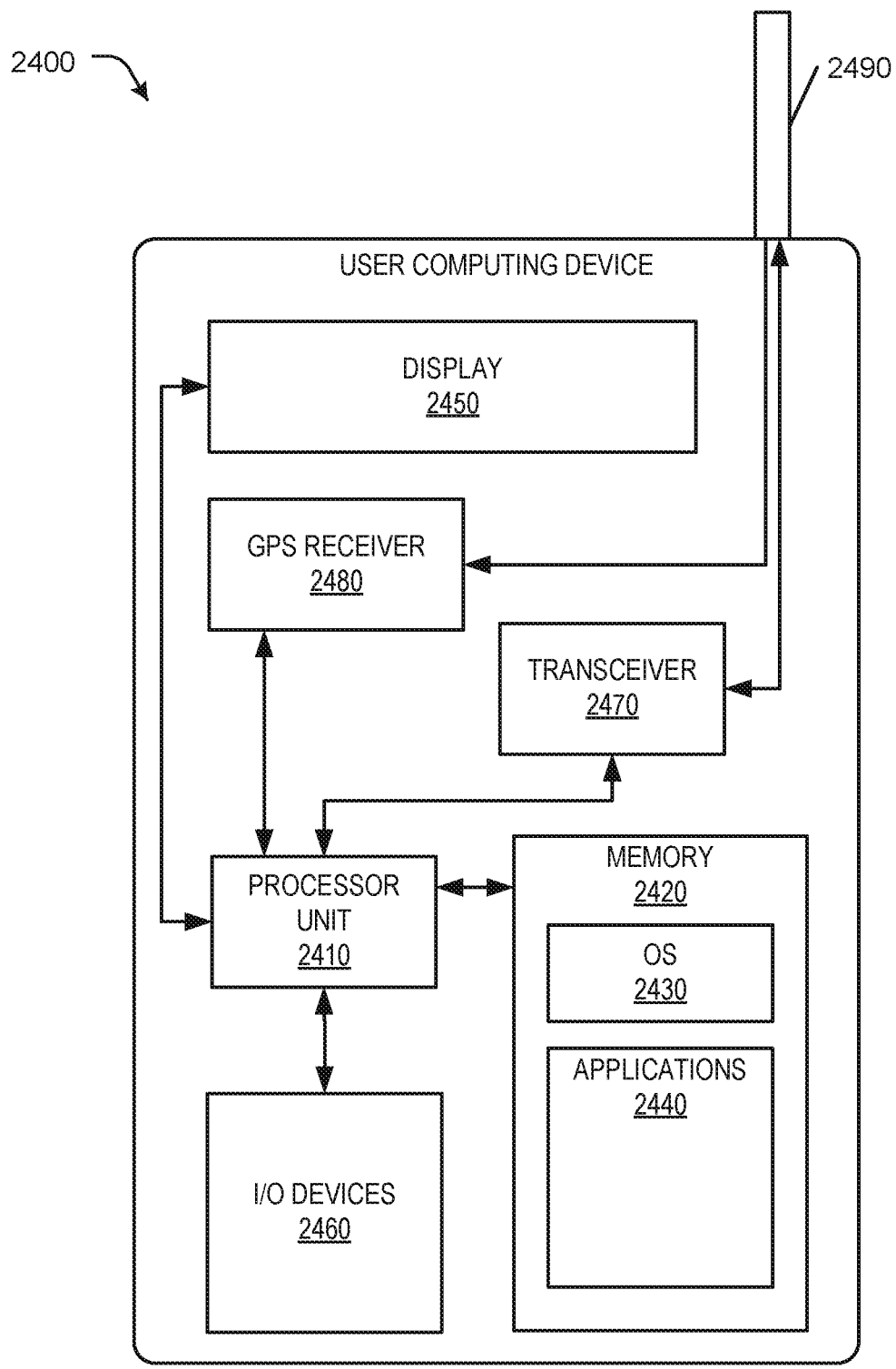
FIG. 24 is a block diagram showing an example architecture of a user computing device.
Figure 25:
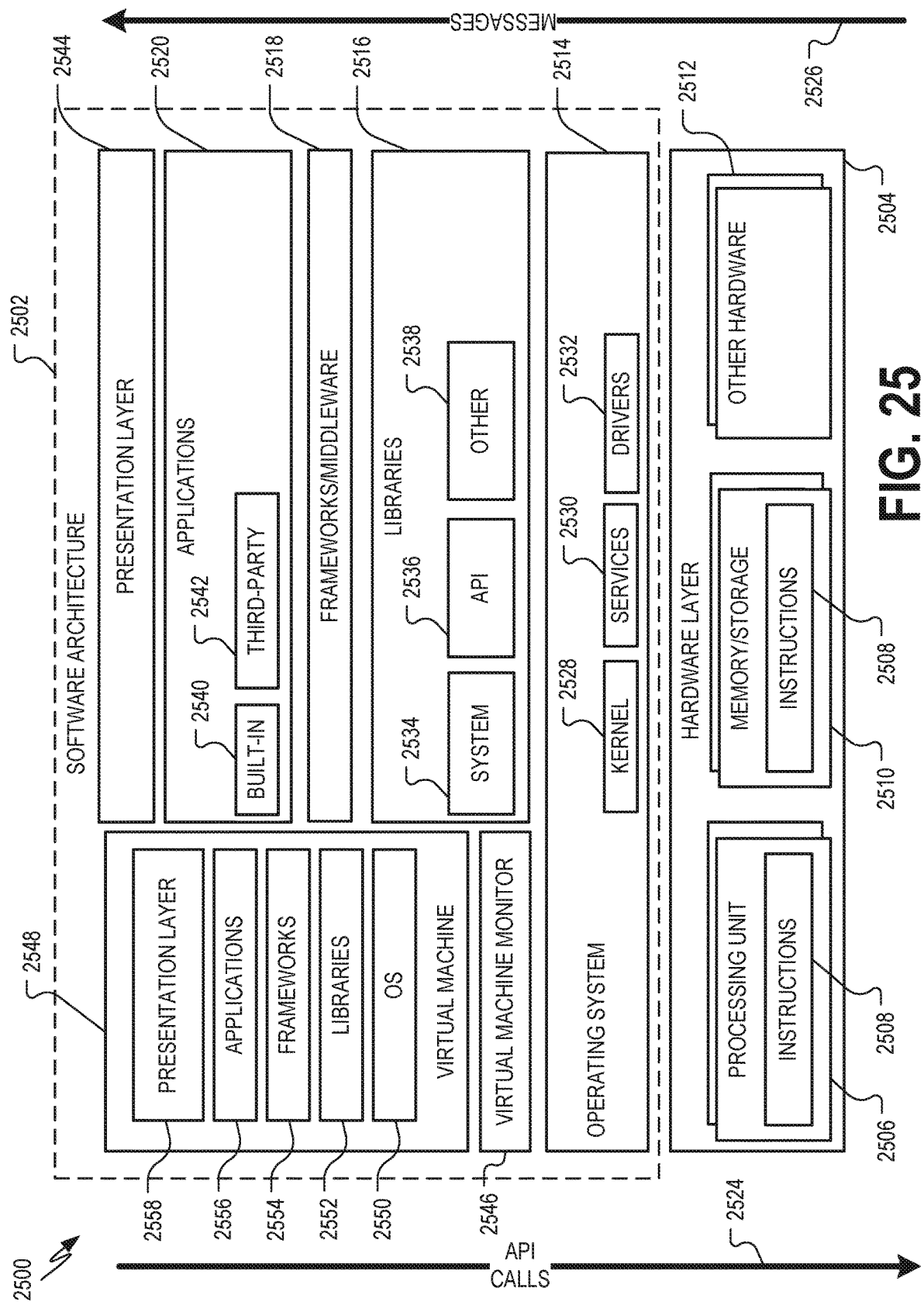
FIG. 25 is a block diagram showing one example of a software architecture for a computing device.
Figure 26:
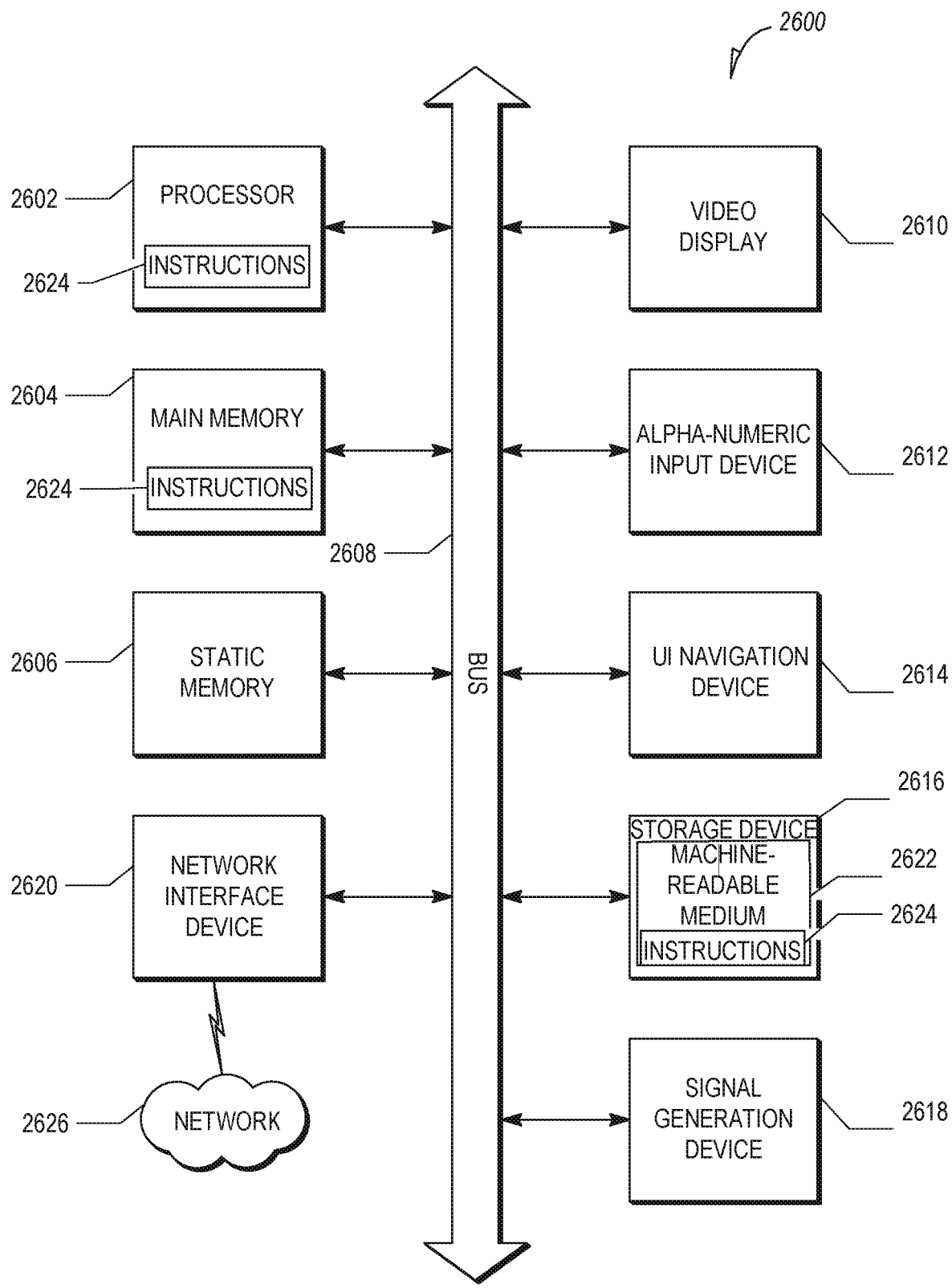
FIG. 26 is a block diagram illustrating a computing device hardware architecture, within which a set or sequence of instructions can be executed to cause a machine to perform examples of any one of the methodologies discussed herein.

FIG. 2 is a diagram showing one example of the environment 100 including additional details of the user computing device 102. The user computing device 102 executes the document application 106. For example, the document application 106 may be executed by a processor unit of the user computing device 102. The user computing device 102 may comprise data storage 148, which may store data for executing the document application 106. For example, the data storage 148 may store application instructions 150 including for example, instructions for executing the document application 106, instructions for executing document-type routines, etc. The data storage 148 may also store data collected for and/or during the execution of an application, including for example, images of the document 108, input data from the user 104, etc. (See. FIGS. 24-26 for examples of processors and other processing units in computing devices.)

The user computing device 102 may also comprise a display 142. The display 142 may be or include any suitable type of display including for example, a liquid crystal display (LCD), an organic light emitting diode (OLED) display, etc. In some examples, the display 142 is a touchscreen or other touch-sensitive display allowing the user 104 to provide input to a user interface (UI) 152. In some examples, the document application 106 is programmed to generate the UI 152, which may be a graphical user interface (GUI). The UI 152 may include screens, such as the screens 126, 127 of FIG. 1. The user 104 may provide input via the UI 152 using the touchscreen (e.g, the display 142 may be or include a touchscreen). Also, in some examples, the user 104 may provide input to the UI 152 using various other input devices of the user computing device 102 in addition to or instead of using a touchscreen. Other input devices may include, for example, a mouse, a track ball, etc.

An imaging device 144 may be used to capture an image of the document 108. In some examples, the imaging device 144 includes a charge-coupled device (CCD) and one or more lenses or other suitable optical components to focus incoming light onto the CCD.

An operating system (OS) 146 may also execute at the user computing device 102. The OS 146 may manage the execution of various applications including for example, the document application 106. The OS 146, in some examples, also manages access to hardware components of the user computing device 102 such as, for example, the display 142, the data storage 148, etc. Any suitable OS may be used including, for example, Android from Google Inc.; or iOS from Apple Inc.

Figure 3:
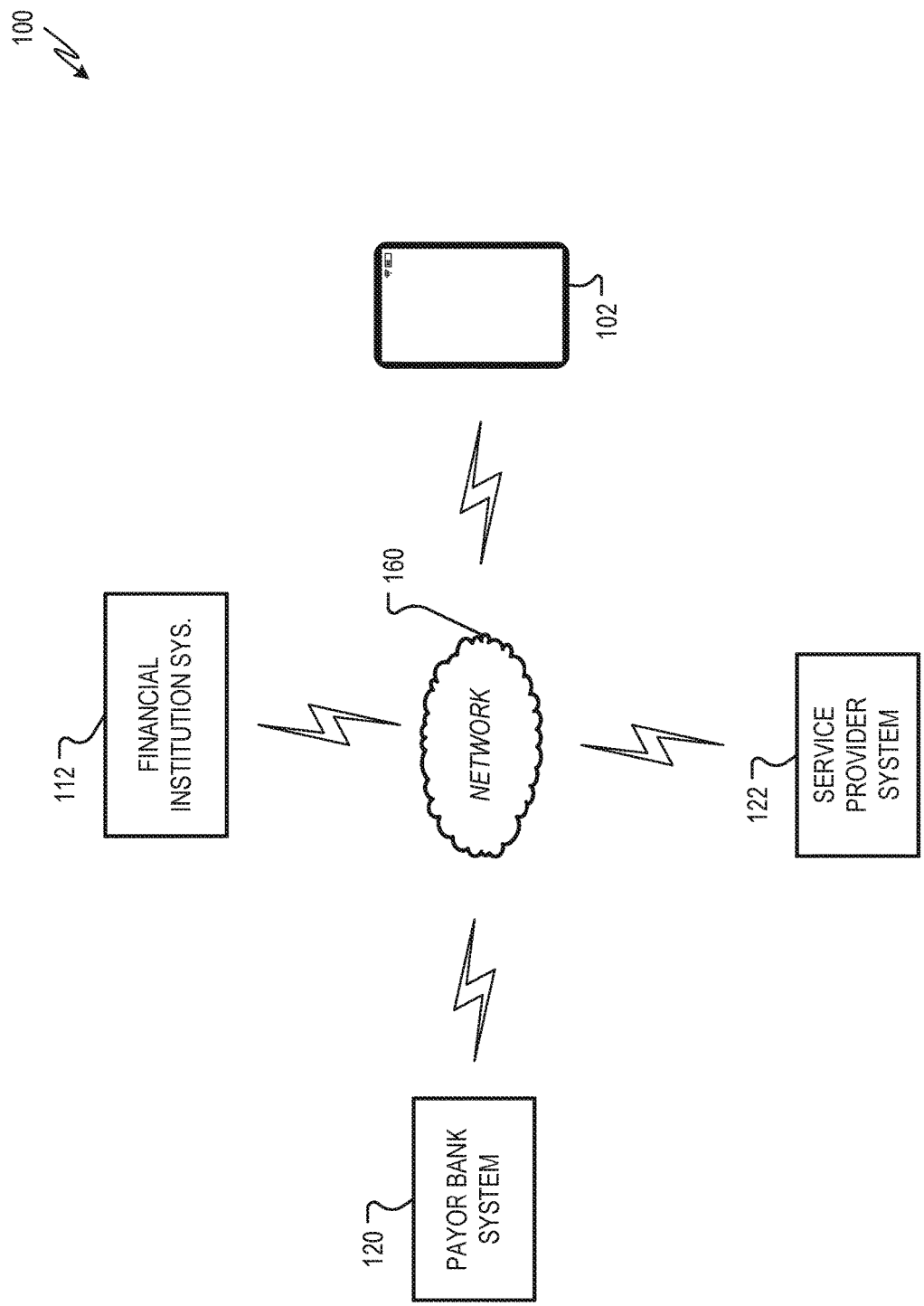
FIG. 3 is a diagram showing another example of the environment of FIG. 1.

FIG. 3 is a diagram showing another example of the environment 100 of FIG. 1. For example, FIG. 3 shows the user computing device 102, the financial institution system 112, the pay or bank system 120, and the service provider system 122. The components 102, 112, 120, 122 are in communication with each other via a network 160. The network 160 may be or comprise any suitable network element operated according to any suitable network protocol. For example, one or more portions of the network 160 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a Wi-Fi network, a WiMax network, another type of network, or a combination of two or more such networks.

Figure 4:
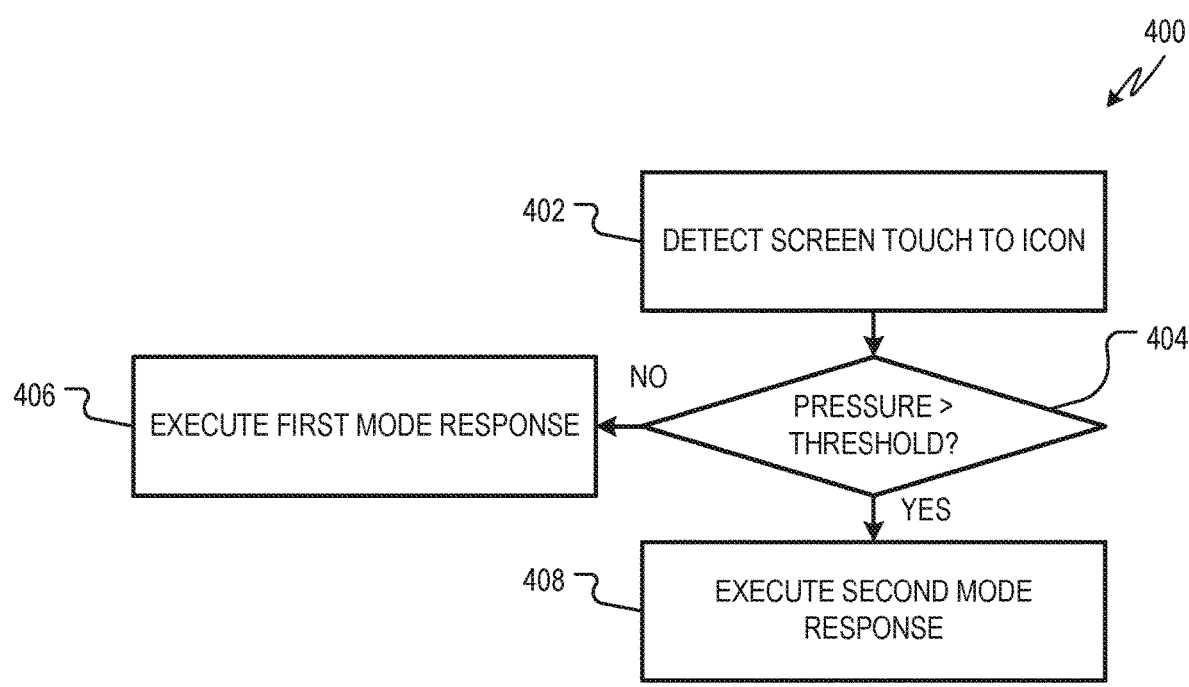
FIG. 4 is a flowchart showing one example of a process flow for selecting a multi-mode launch icon, such as a multi-mode launch icon of FIG. 1.

FIG. 4 is a flowchart showing one example of a process flow 400 for selecting a multi-mode launch icon, such as the multi-mode launch icon 128A of FIG. 1. In the process flow 400, the user 104 selects the multi-mode launch icon 128A in different modes by providing user inputs that include applying different levels of pressure to the display 142 of the user computing device 102. For example, the user computing device 102 may utilize the 3D Touch feature available on some computing devices available from Apple Inc., or may use a similar feature.

At operation 402, the user computing device 102 may detect a user input (e.g., that the user 104 has touched or otherwise selected the display 142 at the position of the multi-mode launch icon 128A). At operation 404, the user computing device 102 may determine if the user input (e.g., the touch to the display 142) is at a pressure greater than a threshold pressure. If the pressure is not greater than the threshold pressure, the user computing device 102 may execute a first mode response at operation 406. If the pressure is greater than the threshold pressure, the user computing device 102 may execute a second mode response at operation 408.

In some examples, the multimode mechanism of the workflow 124 may be executed in conjunction with the multimode mechanism of FIG. 4. For example, in the workflow 124 of FIG. 1, the user 104 selected the multi-mode launch icon 128A once to cause the menu items 130, 132 to display. The mode according to which the user 104 selected the multi-mode launch icon 128A was determined by the menu item 130, 132 that the user 104 selected. In some examples, one or both of the mode response operations 406, 408 may include displaying menu items similar to the menu items 130, 132 shown in FIG. 1.

Figure 5:
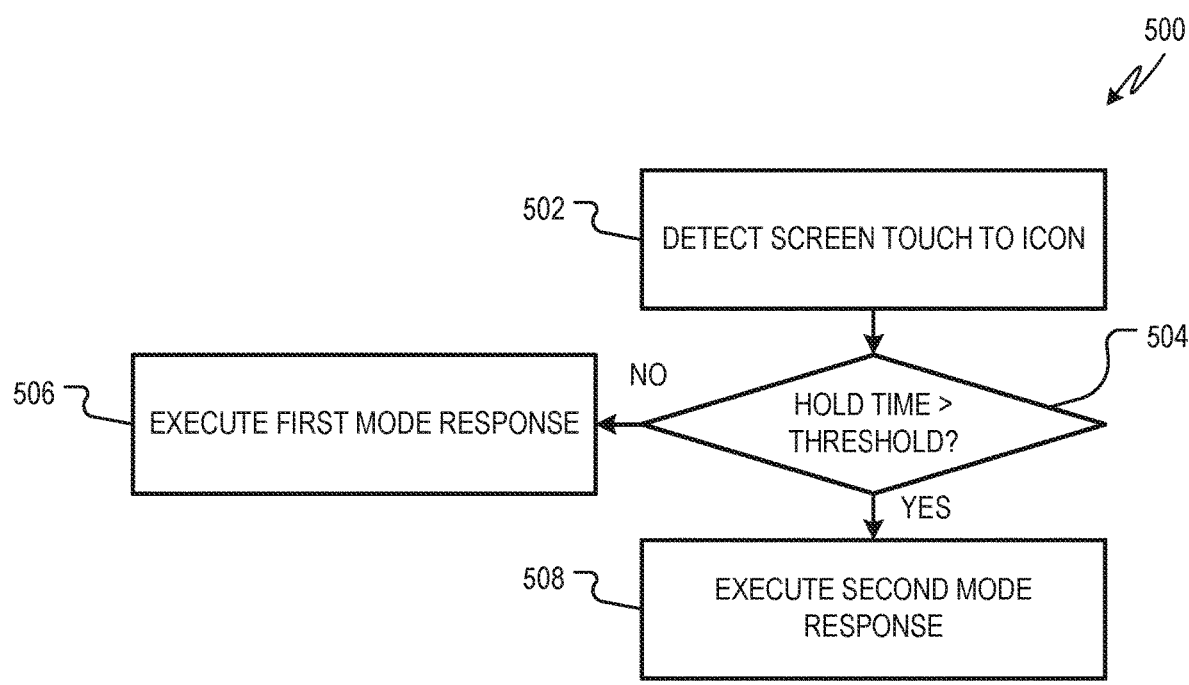
FIG. 5 is a flowchart showing another example of a process flow for selecting a multi-mode launch icon, such as the multi-mode launch icon of FIG. 1.

FIG. 5 is a flowchart showing another example of a process flow 500 for selecting a multi-mode launch icon, such as the multi-mode launch icon 128A of FIG. 1. At operation 502, the user computing device 102 may detect a user input (e.g., that the user 104 has touched or otherwise selected the display 142 at the position of the multi-mode launch icon 128A). At operation 504, the user computing device 102 may determine if the touch or selection is maintained for greater than a threshold time period. If the touch is not maintained for more than the threshold time period, the user computing device 102 may execute a first mode response at operation 506. If the touch is maintained for more than the threshold time period, the user computing device 102 may execute a second mode response at operation 508.

In some examples, the multimode mechanism of the workflow 124 may be executed in conjunction with the multimode mechanism of FIG. 5. For example, in the workflow 124 of FIG. 1, the user 104 selected the multi-mode launch icon 128A once to cause the menu items 130, 132 to display. The mode according to which the user 104 selected the multi-mode launch icon 128A was determined by the menu item 130, 132 that the user 104 selected. In some examples, one or both of the mode response operations 506, 508 may include displaying menu items similar to the menu items 130, 132 shown in FIG. 1.

Figure 6:
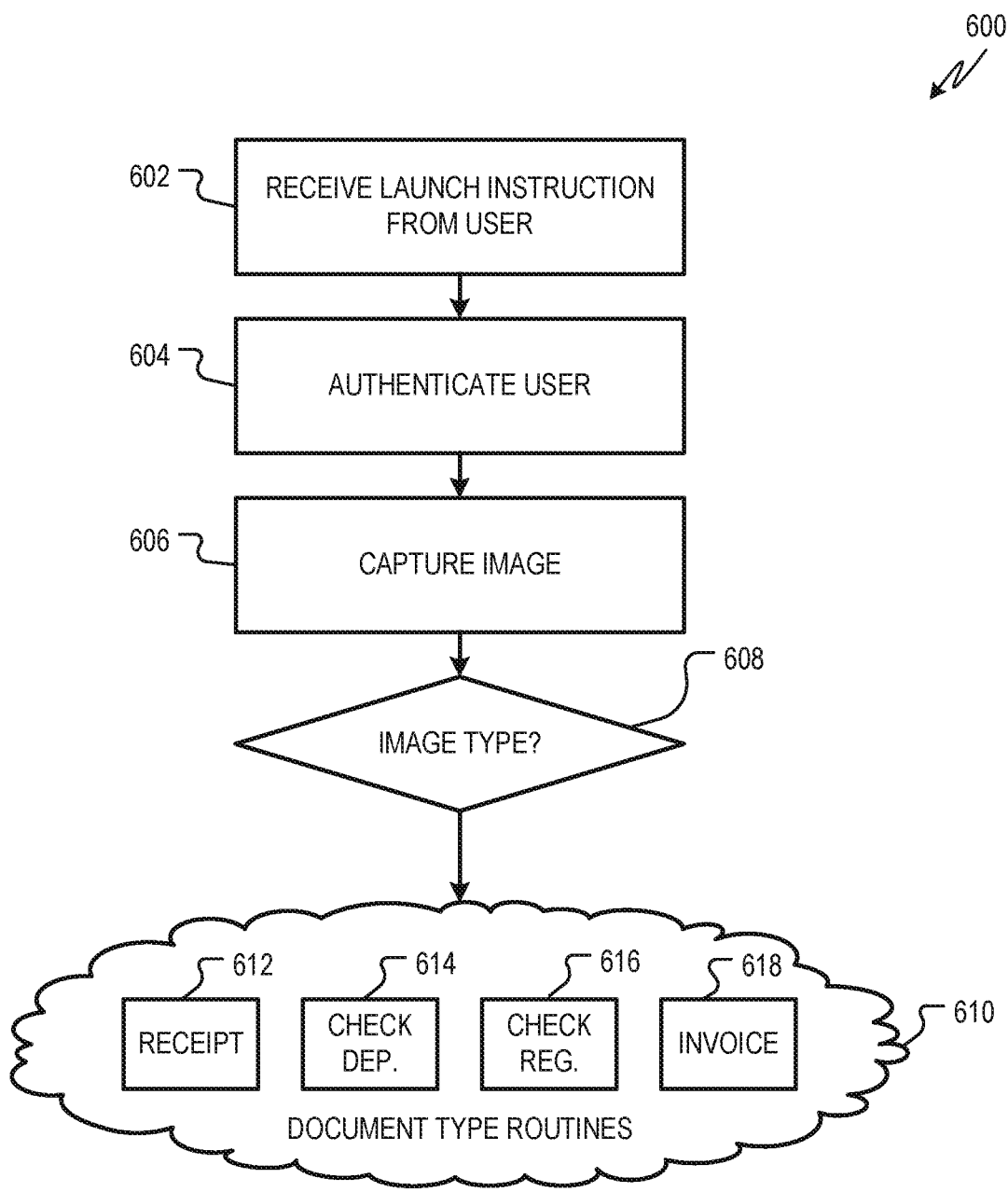
FIG. 6 is a flowchart showing one example of a process flow that may be executed by a document application, for example, to select and execute a document-type routine.

FIG. 6 is a flowchart showing one example of a process flow 600 that may be executed by the document application 106, for example, to select and execute a document-type routine. At operation 602, the document application 106 may receive a launch instruction from the user 104. The launch instruction may be received in any suitable manner. In some examples, the launch instruction is received when the user 104 selects a corresponding mode of a multi-mode launch icon, for example, as described with respect to FIGS. 1, 4, and 5.

At operation 604, the document application 106 may authenticate the user 104. Any suitable authentication technique may be used. For example, the user 104 may enter a user name, a password, a personal identification number (PIN), etc. The document application 106 and user computing device 102 may be configured to utilize biometric authentication. For example, the user computing device 102 (e.g., imaging device 144) may capture a photo of the user's face, eyes, or other feature and compare it to a known image of the user's face, eyes, or other feature. Also, in some examples, the user computing device 102 may comprise a sensor for taking the user's fingerprint. A captured fingerprint may be compared to a known fingerprint.

At operation 606, the document application 106 may capture an image of the document 108. For example, the document application 106 may cause the user computing device 102 to display an image capture screen, similar to the image capture screen 127 of FIG. 1. The user 104 may position the user computing device 102 and the document 108 and initiate the capture of the image of the document 108, for example, by selecting a capture button similar to the capture button 135 of FIG. 1. At operation 608, the document application 106 may determine a type of the document 108. In some examples, the document application 106 may perform optical character recognition (OCR) or another suitable image processing algorithm to determine the type of the document 108. In some examples, the document application 106 may send some or all of the captured image to the financial institution system 112 (e.g., the image processor application 118), which may perform OCR or another suitable image processing algorithm to identify the type of the document 108.

Depending on the type of the document 108, at operation 610, the document application 106 may select and launch an appropriate document-type routine. The example of FIG. 6 shows four example document-type routines 612, 614, 616, 618 that may be launched. For example, if the document 108 is a receipt, the document application 106 may launch a receipt routine 612. The receipt routine 612 may match the receipt to a corresponding debit to an account of the user 104. If the document 108 is a check to be deposited, the document application 106 may launch a check deposit routine 614. The check deposit routine 614 may deposit the check to an account of the user 104. If the document 108 is a check register or a user-executed check, the document application 106 may launch a check register routine 616. The check register routine 616 may store data describing the user-executed check or check register to compare to checks presented for payment. If the document 108 is an invoice, the document application 106 may launch an invoice routine 618. The invoice routine 618 may facilitate payment of the invoice by the user 104.

Figure 7:
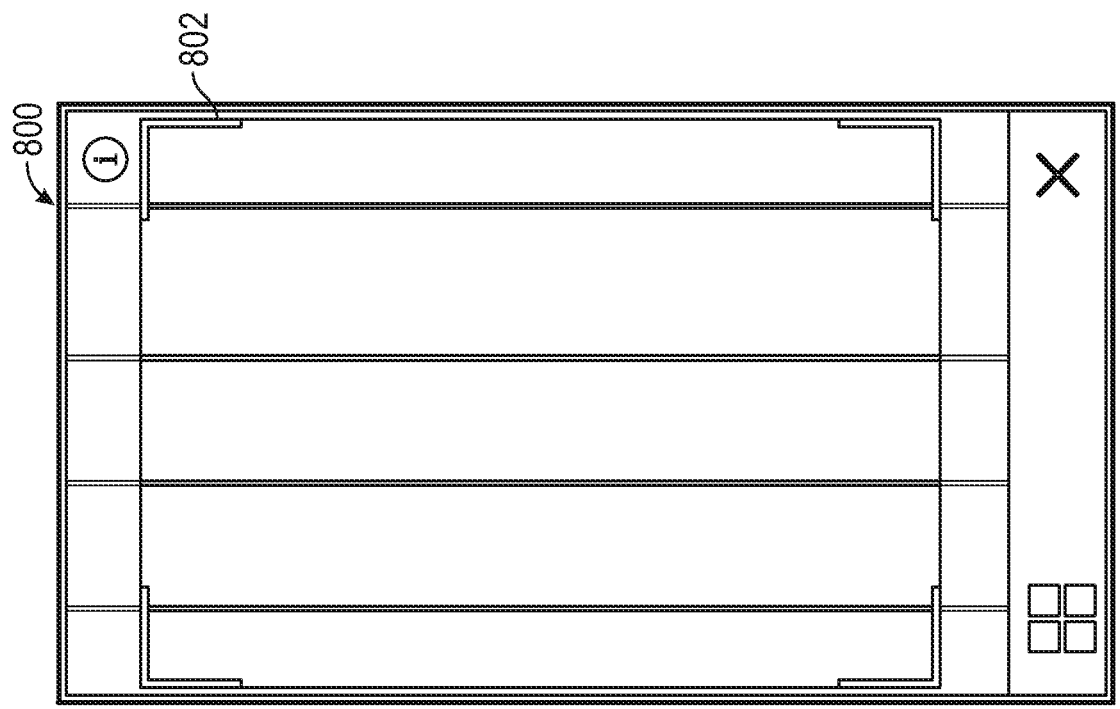
FIG. 7 is a screenshot showing one example of a screen that may be shown to a user including a multi-mode launch icon.

FIG. 7 is a screenshot showing one example of a screen 700 that may be shown to the user 104 including a multi-mode launch icon 702. The multi-mode launch icon 702 may be selectable according to at least two modes. For example, in the screen 700, the user 104 has selected the multi-mode launch icon 702 to display two menu items 704, 706. The user 104 may select one of the two menu items 704, 706. For example, selecting the menu item 706 may launch the document application 106. Selecting the menu item 704 may launch another application or functionality.

Figure 8:
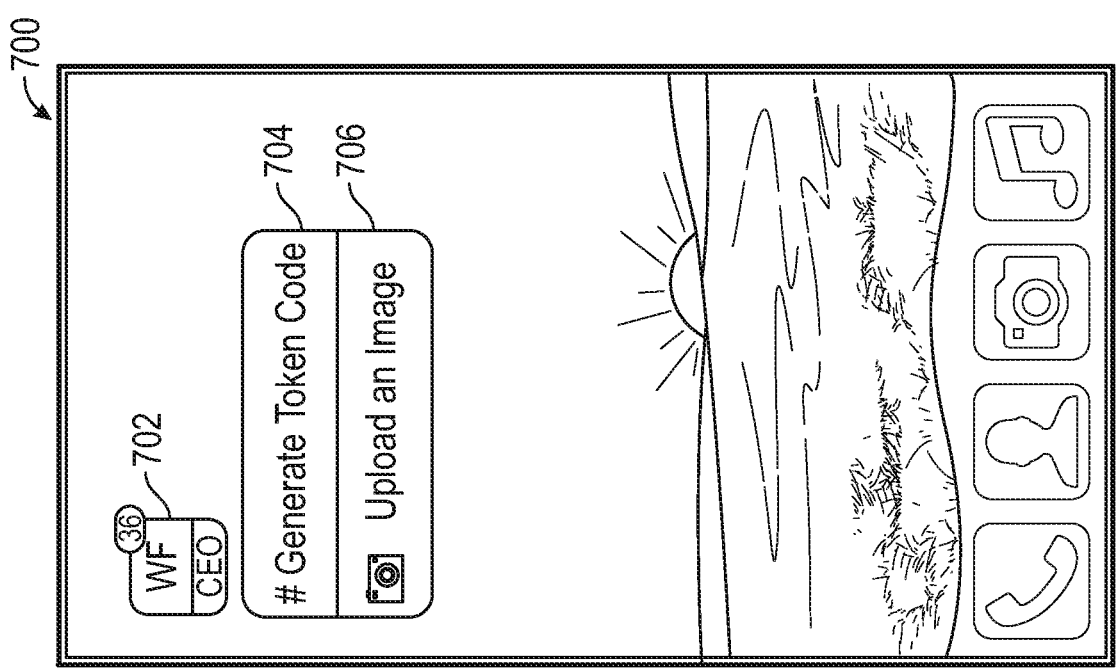
FIG. 8 is a screenshot showing one example of an initial image capture screen that may be shown to the user by the document application to capture an image of a document.
Figure 9:
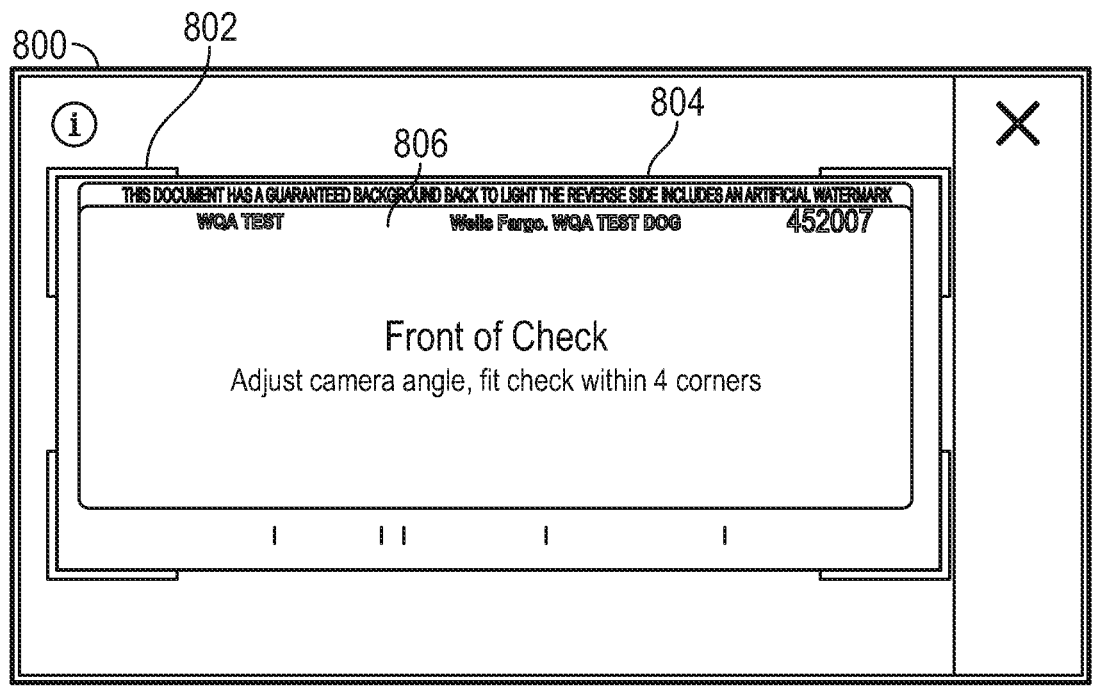
FIG. 9 is a screenshot showing another example of the screen of FIG. 8 including a captured document image.

FIG. 8 is a screenshot showing one example of an initial image capture screen 800 that may be shown to the user 104 by the document application 106, for example, to capture an image of the document 108. For example, the image capture screen 800 displays a current output of the imaging device 144. In some examples, as shown in FIG. 8, the image capture screen 800 also displays a frame 802 that may aid the user 104 in positioning the document 108 for imaging. The document application 106, in some examples, is configured to capture an image of the document 108 automatically when the user 104 positions the document 108 in the frame 802. FIG. 9 is a screenshot showing another example of the screen 800 of FIG. 8 including a captured document image 804. FIG. 9 also shows an information field 806 that may indicate the type of document that has been imaged as well as an instruction to position the document in the frame 802.

Figure 10:
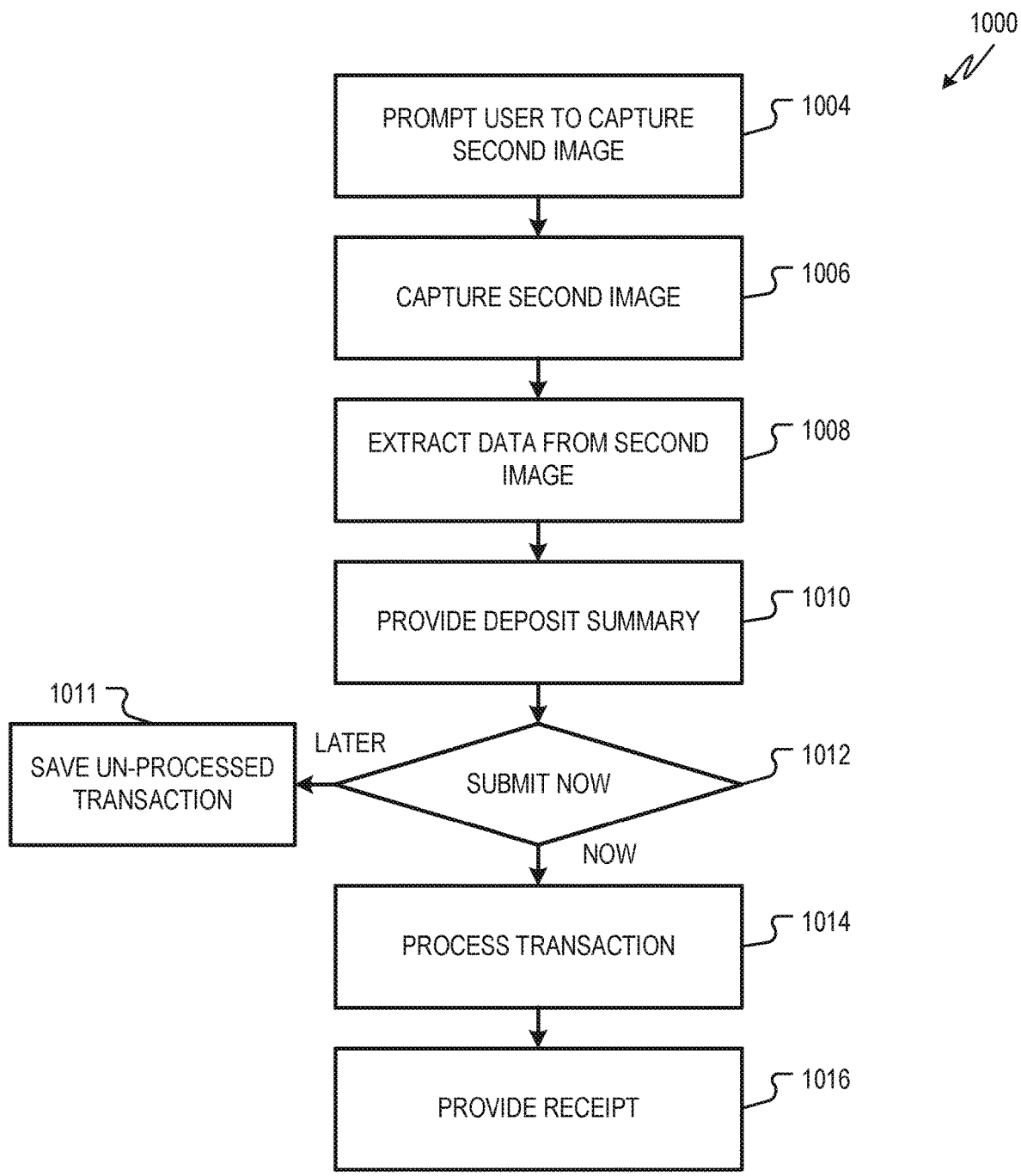
FIG. 10 is a flowchart showing one example of a process flow that may be executed by a check deposit routine, for example, when the document application of FIG. 1 determines that the document is a check to be deposited.
Figure 11:
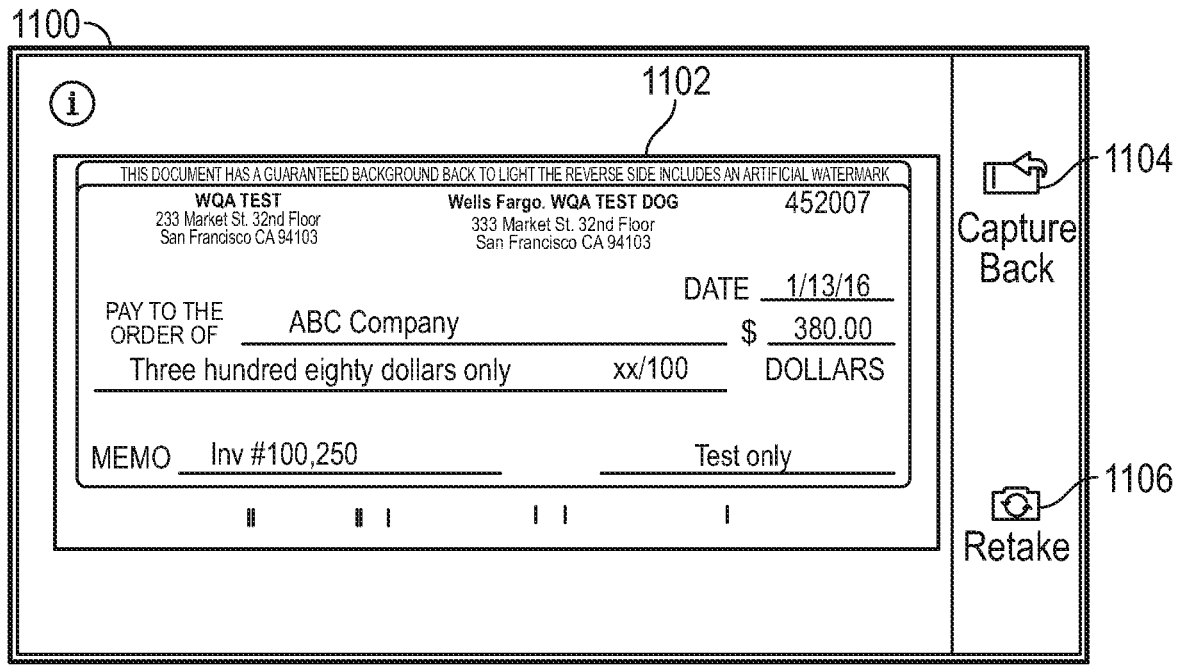
FIG. 11 is a screenshot showing one example of a check image capture screen that may be displayed, for example, when an image of a check has been captured.
Figure 12:
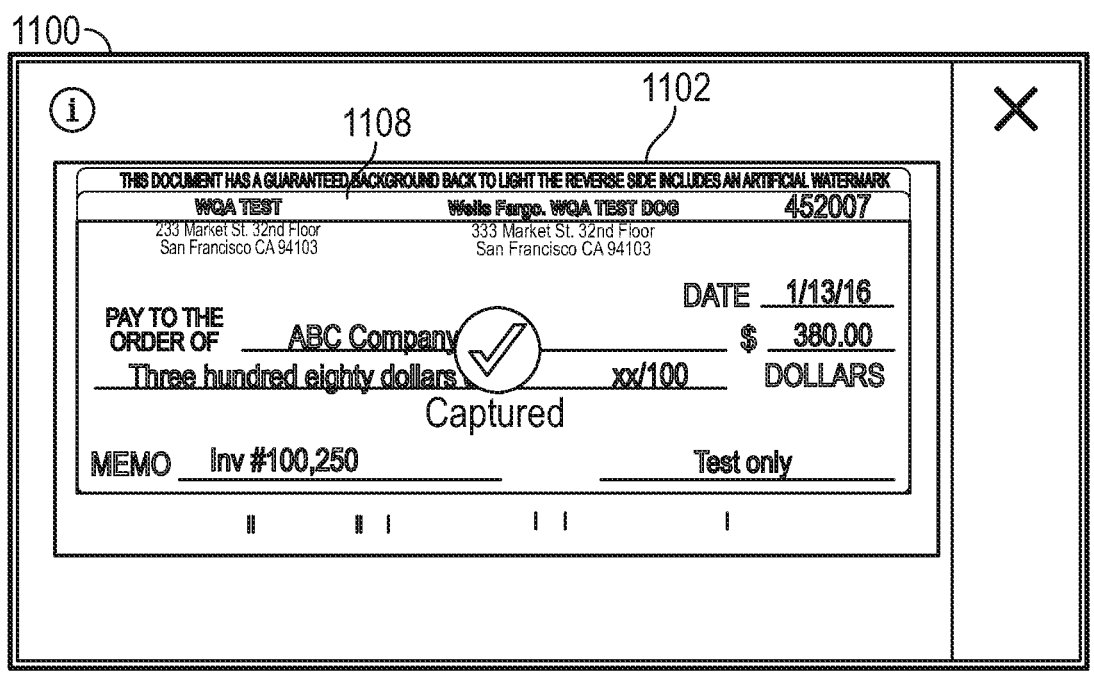
FIG. 12 is a screenshot showing one example of the check image capture screen including a success field indicating that the image of the check has been captured.

FIG. 10 is a flowchart showing one example of a process flow 1000 that may be executed by a check deposit routine 614, for example, when the document application 106 determines that the document 108 is a check to be deposited. FIGS. 11-16 show screenshots that may be displayed at the user computing device 102 while the check deposit routine 614 is executing. For example, FIG. 11 is a screenshot showing one example of a check image capture screen 1100 that may be displayed, for example, when an image of a check has been captured. For example, the image capture screen 1100 includes a captured image 1102 of the check. FIG. 11 also shows a Capture Back button 1104, which may return the user 104 to the document application 106, for example, to capture another document image. The screen 1100 also includes a Retake button 1106 that the user 104 may select to capture another image of the check, for example, if the initial captured image is not clear. FIG. 12 is a screenshot showing one example of the screen 1100 including a success field 1108 indicating that the image 1102 of the check has been captured. In some examples, the screen 1100 in the configurations shown in FIGS. 11 and 12 may be displayed to the user 104 by the document application 106, for example, before the check deposit routine 614 is launched.

Figure 13:
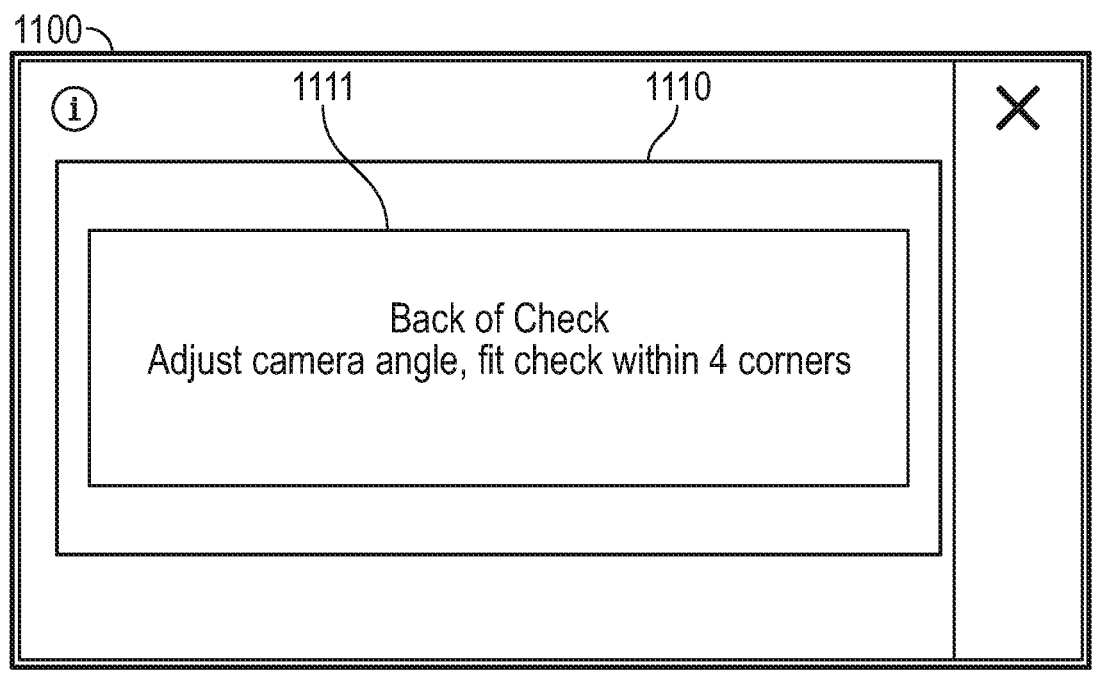
FIG. 13 is a screenshot showing one example of the check image capture screen showing an image of the back of the check shown in FIGS. 11-12.
Figure 14:
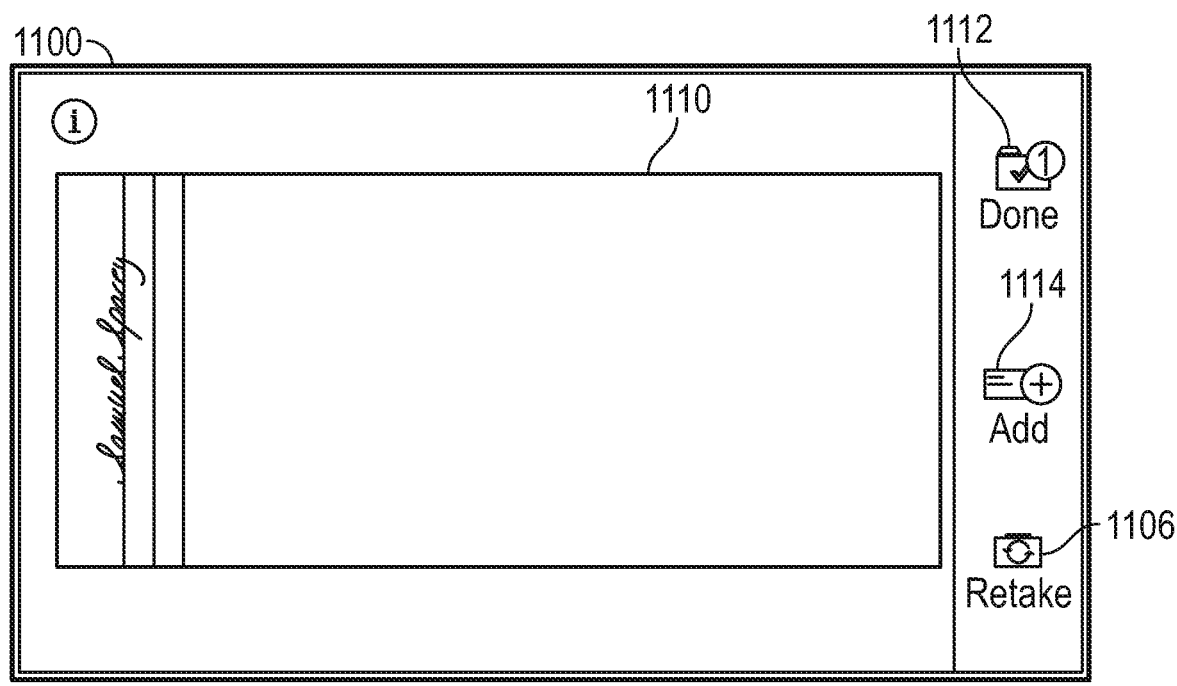
FIG. 14 is a screenshot showing one example of the check image capture screen showing that the image of the back of the check shown in FIG. 13 has been captured.

Referring back to FIG. 10, at operation 1004, the check deposit routine 614 may prompt the user 104 to capture a second image of the back of the check. For example, FIG. 13 is a screenshot showing one example of the image capture screen 1100 showing an image 1110 of the back of the check shown in FIGS. 11-12. FIG. 13 also shows an instruction field 1111 instructing the user 104 on placement of the check. At operation 1006, the check deposit routine 614 may capture the second image of the back of the check. For example, FIG. 14 is a screenshot showing one example of the image capture screen 1100 showing that the image 1110 of the back of the check shown in FIG. 13 has been captured. The screen 1100 in FIG. 14 also includes a Done button 1112, which the user 104 may select to move on to the next operation. An Add button 1114 may be selected to capture an additional image of an additional document for further processing.

Referring again back to FIG. 10, at operation 1008, the check deposit routine 614 may extract data from the second image. The data may include, for example, an endorsement of the check by the payee (e.g., the user 104). The check deposit routine 614 may extract the data itself or, in some examples, may pass the image of the back of the check to another system, such as the financial institution system 112, where it may be processed by the image processor application 118.

Figure 15:
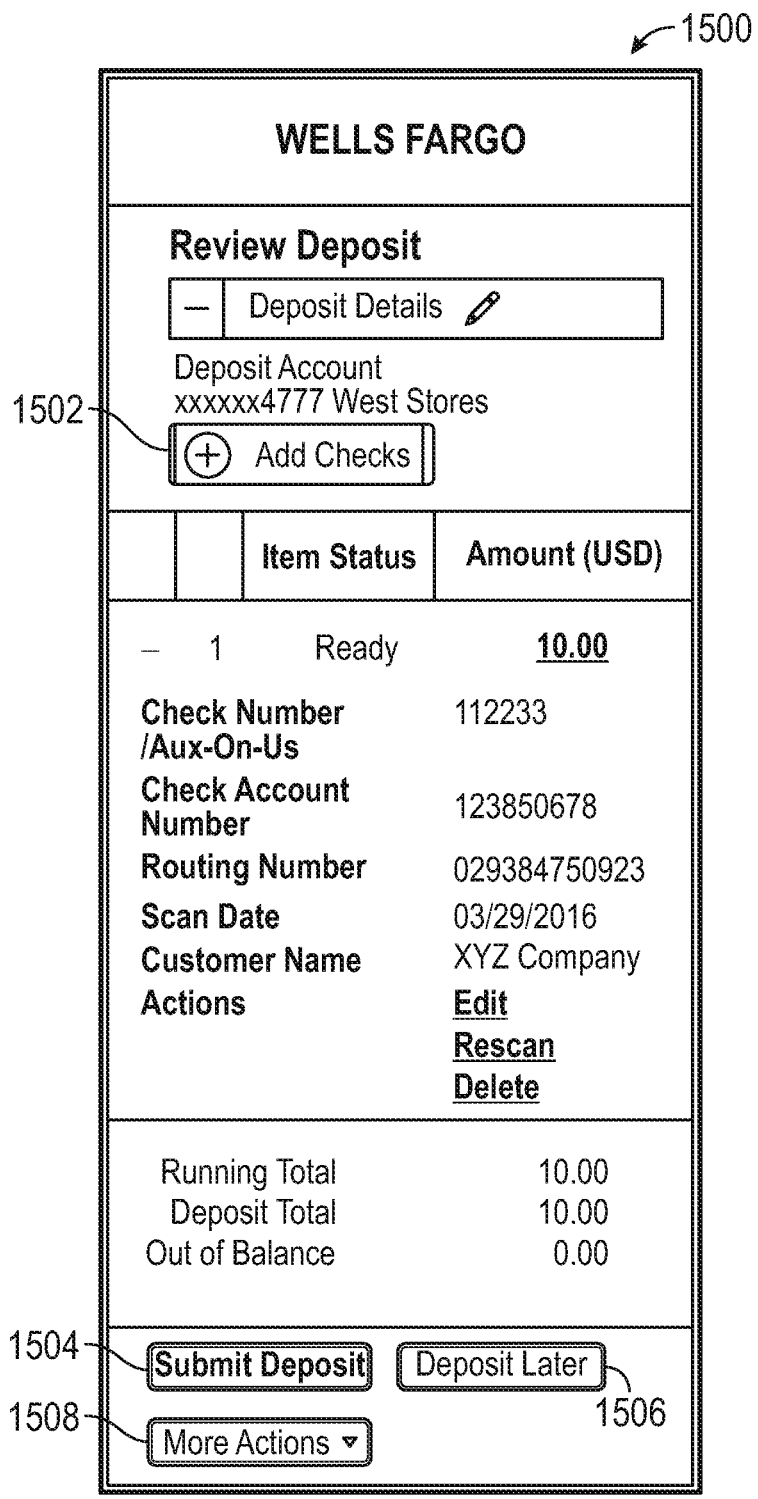
FIG. 15 is a screenshot showing one example of a deposit summary screen that may be displayed by the check deposit routine to provide the user with a deposit summary.

At operation 1010, the check deposit routine 614 may provide the user 104 with a deposit summary. The deposit summary may describe the deposit to be made to the user's account based on the check. A deposit summary may include, for example, an indication of the amount to be deposited, an indication of the account or accounts to which the amount will be deposited, etc. FIG. 15 is a screenshot showing one example of a deposit summary screen 1500 that may be displayed by the check deposit routine 614 to provide the user 104 with a deposit summary. For example, the screen 1500 includes a check number of the check, an account number of an account from which the check will be paid, a routing number, a date on which the check was scanned, a name of the customer (e.g., the user 104), an amount of the check, and a total amount of the deposit. In some examples, the user 104 may select an Add Checks button 1502 to scan additional checks that may be added to the same deposit. Accordingly, if more than one check is scanned, the running total and deposit total may not be equal.

Referring back to FIG. 10, at operation 1012, the check deposit routine 614 may prompt the user 104 to determine whether to deposit the check now or later. For example, referring again to FIG. 15, the screen 1500 may include a Submit Deposit button 1504 that the user 104 may select to submit the deposit now. A Deposit Later button 1506 may be selected by the user 104 to delay the deposit. For example, referring to FIG. 10, if the user 104 selects the Deposit Later button 1506, the check deposit routine 614 may save the un-processed deposit for later processing at operation 1011.

If the user 104 selects the Submit Deposit button 1504, the check deposit routine 614 may submit the deposit, for example, by sending a deposit request to the financial institution system 112. The financial institution system 112 (e.g, a document-type routine component 114, 116) may execute the deposit, for example, by contacting a payor bank system 120 to present the check for payment. The screen 1500 of FIG. 15 also includes a More Actions button 1508 that the user 104 may select to access additional functionality of the check deposit routine 614 and/or the document application 106, such as, for example, capturing a new image of a new document.

Figure 16:
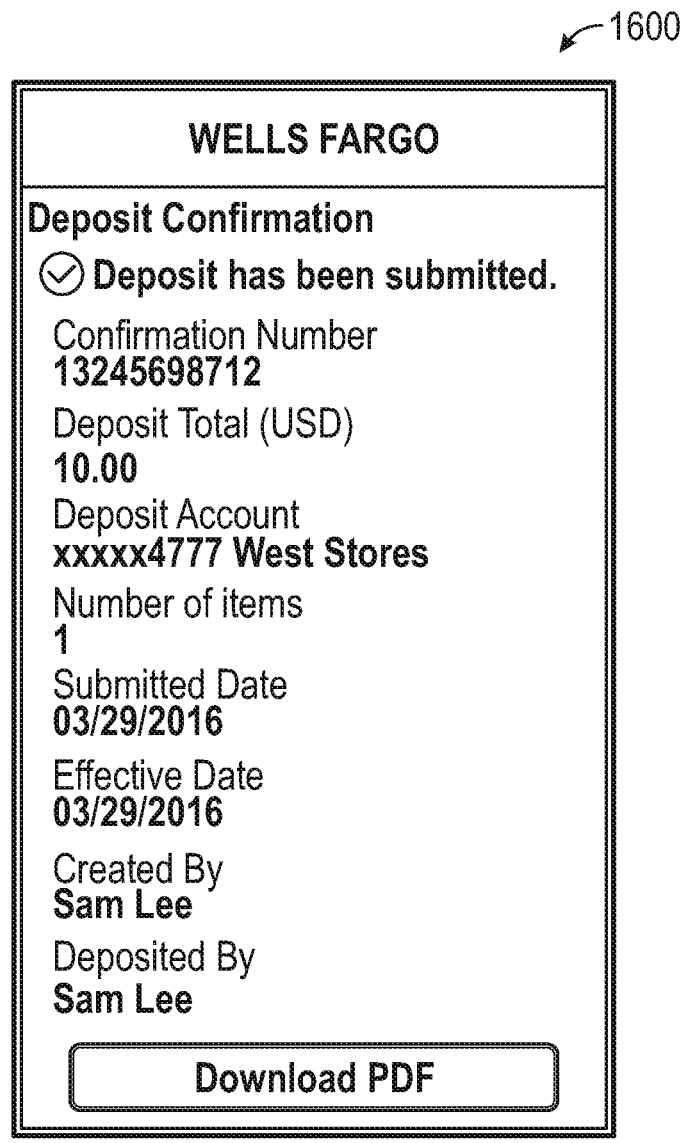
FIG. 16 is a screenshot showing one example of a deposit receipt screen that may be provided to the user.

At operation 1016, the check deposit routine 614 may provide the user 104 with a receipt indicating the deposit. FIG. 16 is a screenshot showing one example of a deposit receipt screen 1600 that may be provided to the user 104 at operation 1016. The receipt may include various information about the deposit including for example, a confirmation number, a deposit total, an indication of an account to which the deposit was made, a submission date, an effective date, and an indication of the user 104. In some examples, various operations of the process flow 1000 may be omitted. E.g., in some examples, the check deposit routine 614 may complete a deposit automatically after operation 1008 or operation 1010 without first prompting the user 104 to confirm.

Figure 17:
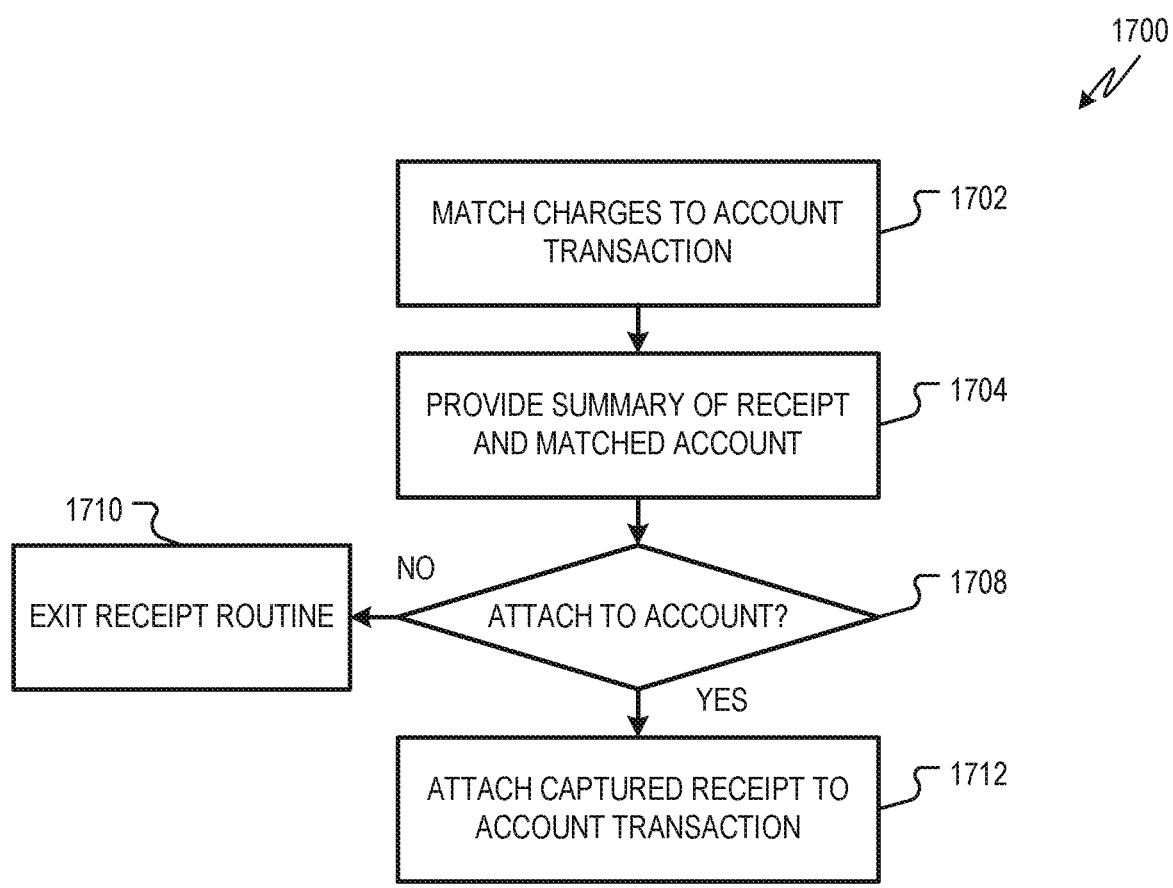
FIG. 17 is a flowchart showing one example of a process flow that may be executed by a receipt flow to process a receipt.
Figure 19:
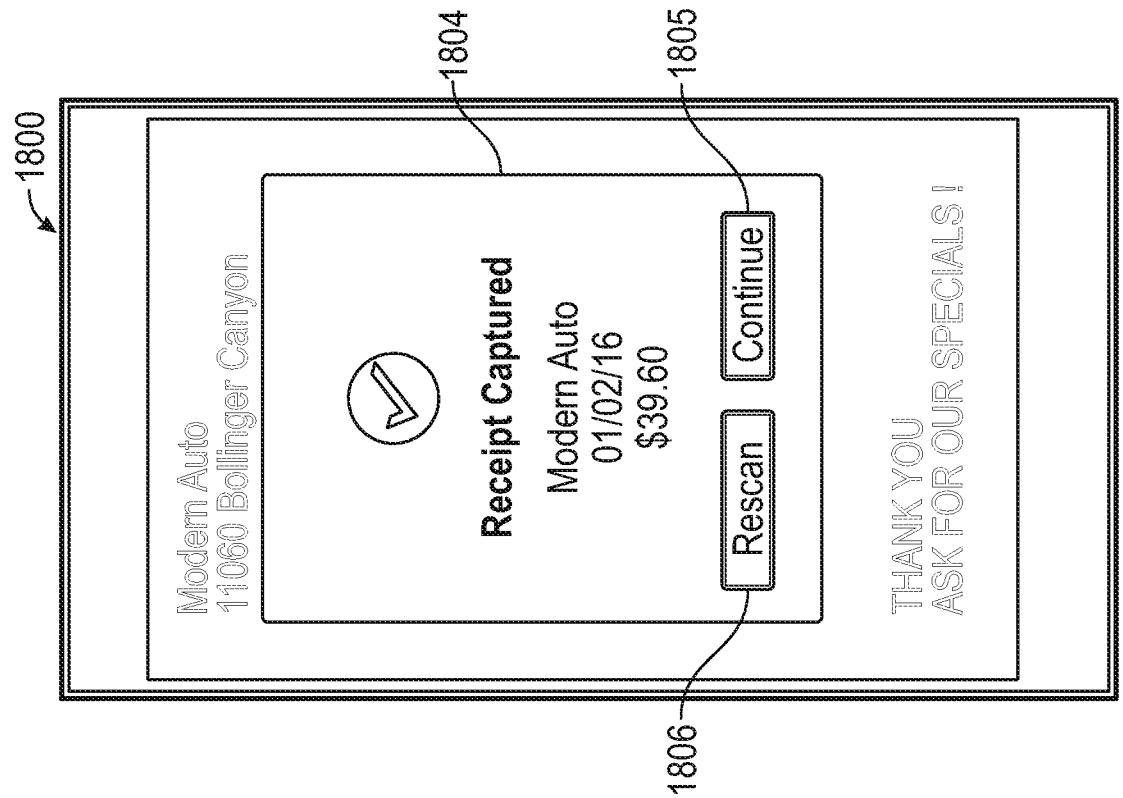
FIG. 19 is a screenshot showing one example of the image capture screen of FIG. 18 with a receipt summary field.
Figure 18:
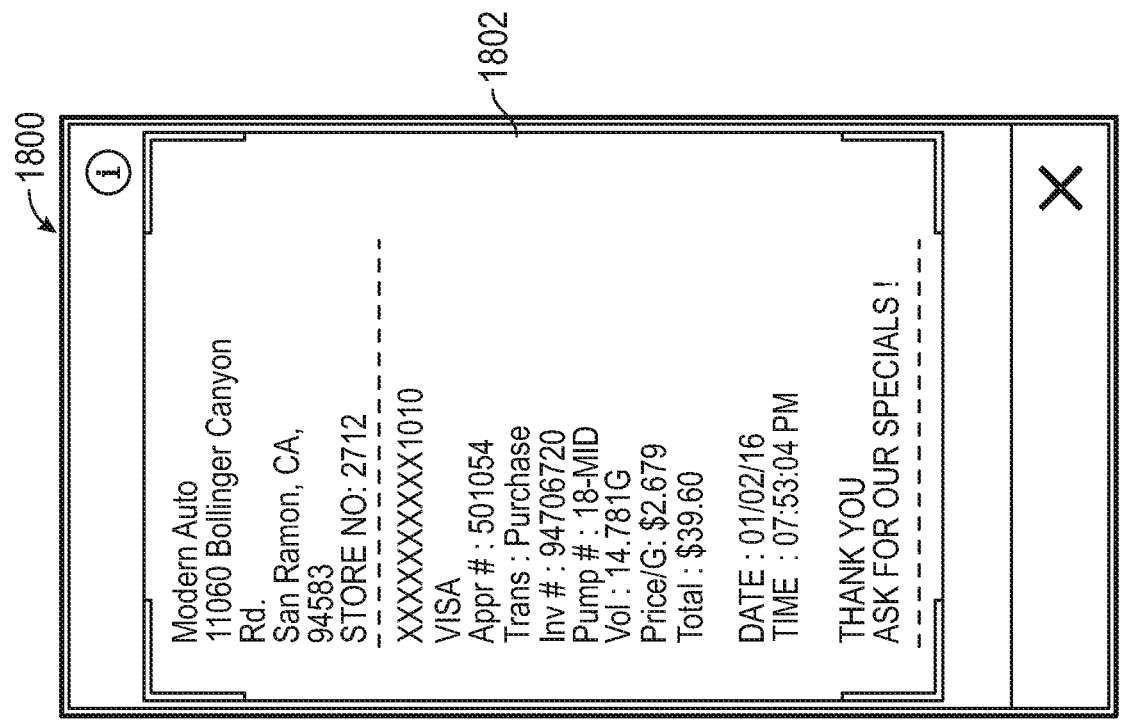
FIG. 18 is a screenshot showing one example of an image capture screen that may be provided to the user showing an image of a receipt.

FIG. 17 is a flowchart showing one example of a process flow 1700 that may be executed by a receipt routine 612 to process a receipt, and FIGS. 18-21 show screenshots that may be provided by the receipt routine 612 and/or document application 106. For example, FIG. 18 is a screenshot showing one example of an image capture screen 1800 that may be provided to the user 104 showing an image 1802 of a receipt. For example, the image 1802 may have been captured as described with respect to FIG. 6. FIG. 19 is a screenshot showing one example of the image capture screen 1800 of FIG. 18 with a receipt summary field 1804 indicating that the document application 106 has determined that the captured image depicts a receipt. The receipt summary field 1804 may also include other data describing the receipt, such as, for example, a purchase amount of the receipt, an indication of a merchant or vendor that issued the receipt, a date of the receipt, etc. In some examples, the receipt summary field 1804, or another portion of the image capture screen 1800, includes a Rescan button 1806. If the user 104 selects the Rescan button 1806, the document application 106 may capture another image of the document 108. If the user 104 selects the Continue button 1805, the receipt routine 612 may launch and execute, for example, as described with respect to FIG. 17.

Figure 20:
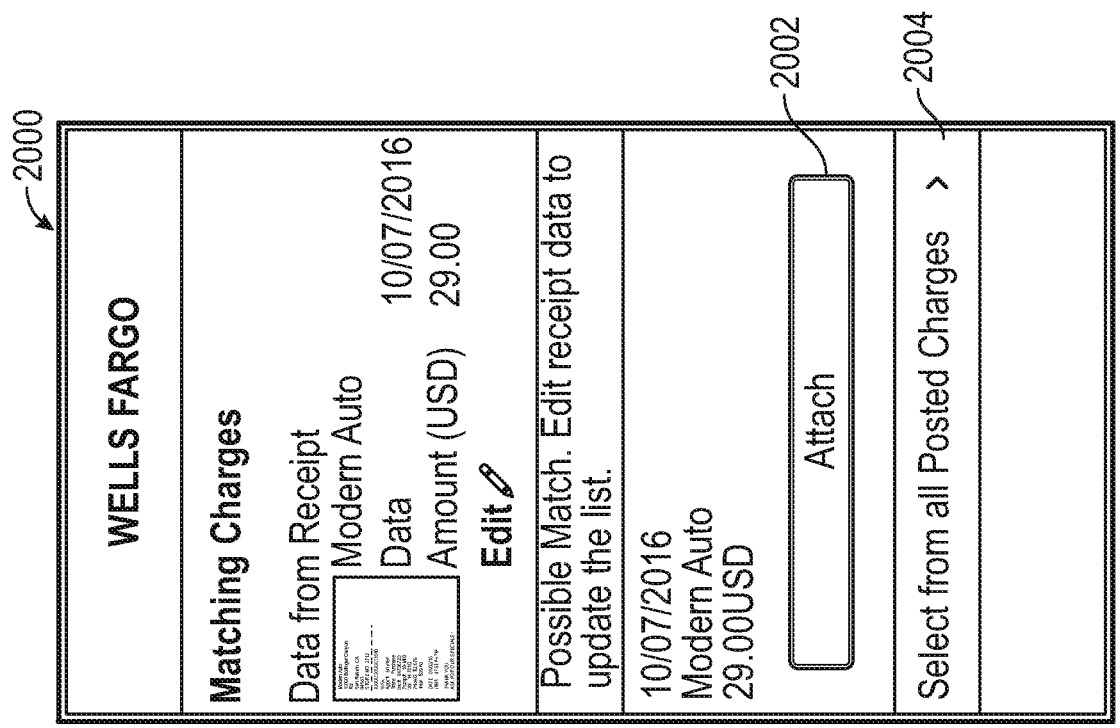
FIG. 20 is a screenshot showing one example of a receipt attachment screen prompting the user to attach the receipt to an account.

At operation 1702, the receipt routine 612 may match the charges indicated by the receipt to a transaction, such as a debit, to an account of the user 104. For example, the receipt routine 612 may communicate the purchase amount of the receipt and/or other information about the receipt to the financial institution system 112 (e.g., a document-type routine component 114, 116 thereof). The financial institution system 112 may cross-check the data describing the receipt with debits or other withdrawals from the user's account. If no match is found, the receipt routine 612 may end. If a match is found, the receipt routine 612 may, at operation 1704 provide a summary of the receipt and matched account and, at operation 1708, prompt the user 104 to attach the receipt (e.g, the captured image of the receipt) to the account. FIG. 20 is a screenshot showing one example of a receipt attachment screen 2000 prompting the user 104 to attach the receipt to an account. The screen 2000 shows data describing the receipt, such as the date, the amount, the issuing vendor, etc. The screen 2000 also includes a manual post menu 2004. If the user 104 selects the manual post menu 2004, the receipt routine 612 may allow the user 104 to manually match the receipt to a debit on the account. If the user 104 declines to attach the receipt to the account, the receipt routine 612 may end at operation 1710.

Figure 21:
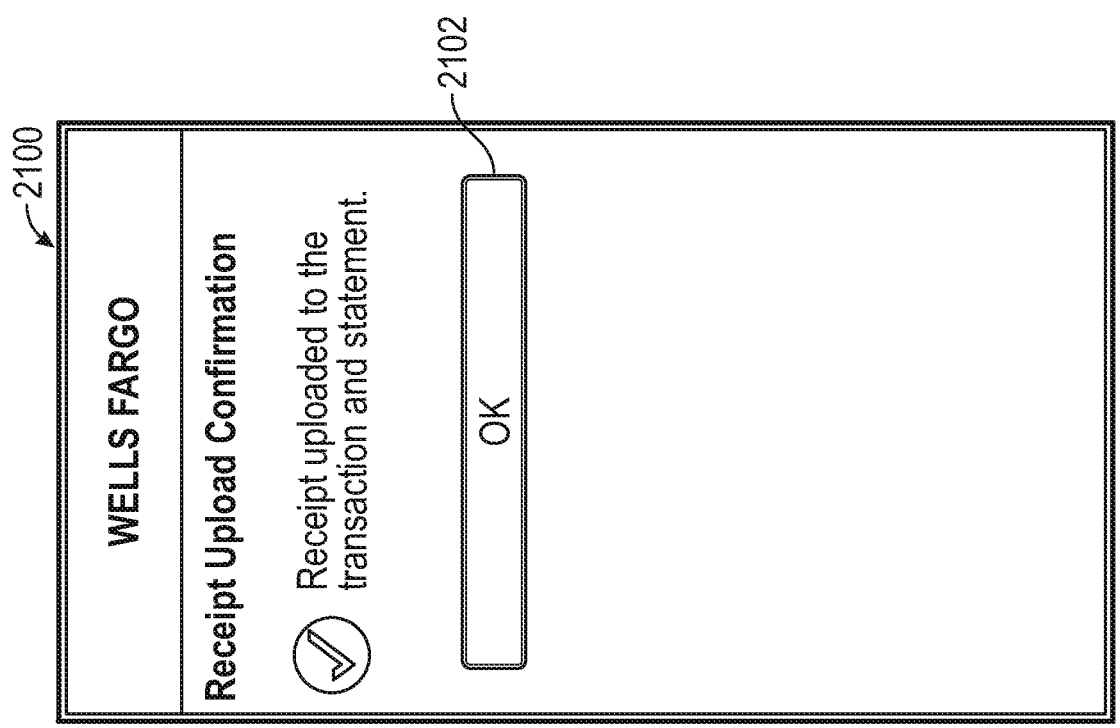
FIG. 21 is a screenshot showing one example of a receipt confirmation screen.

If the user 104 provides an approval to correlate the receipt with the identified debit, for example, by selecting an Attach button 2002, then at operation 1712, the receipt routine 612 may attach the receipt to the indicated debit at the user's account. Attaching the receipt to the user's account may include, for example, writing to an account database entry describing the account a copy of the captured image of the receipt and/or a copy of data describing the receipt that was extracted from the captured image. This transaction may be useful, for example, to document the user's expenses, to balance the user's account, etc. Optionally, the receipt routine 612 may display a receipt confirmation screen confirming the transaction. FIG. 21 is a screenshot showing one example of a receipt confirmation screen 2100. The screen 2100 includes an OK button 2102 that the user 104 may select, for example, to exit the receipt routine 612 and return to the document application 106.

Figure 22:
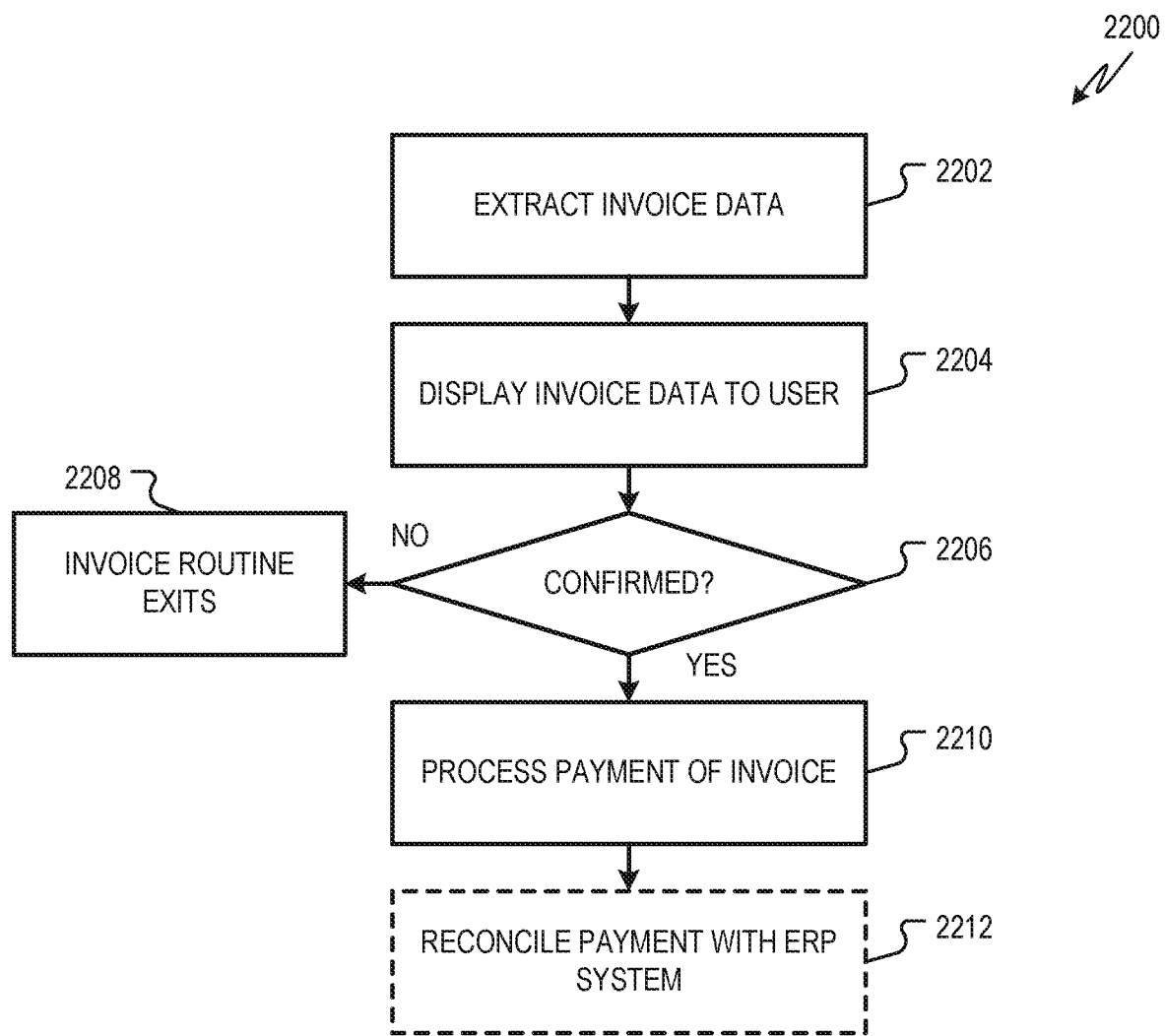
FIG. 22 is a flowchart showing one example of a process flow that may be executed, for example, by an invoice routine to process a captured image of an invoice.

FIG. 22 is a flowchart showing one example of a process flow 2200 that may be executed, for example, by the invoice routine 618 to process a captured image of an invoice. For example, the invoice routine 618 may launch after the document application 106 has captured an image of the document 108 and identified that the document 108 is an invoice, as described herein. At operation 2202, the invoice routine 618 may extract invoice data from the captured image of the invoice. The invoice routine 618 may do this directly and/or may send the captured image to the financial institution system 112 and/or the image processor application 118. At operation 2204, the invoice routine 618 may display the extracted invoice data to the user 104. The invoice data may include, for example, an indication of an issuer of the invoice, an amount of the invoice (e.g., invoice amount), an invoice number, an invoice due date, etc. The invoice routine 618 may prompt the user 104 to confirm the invoice at operation 2206, for example, by displaying to the user 104 a screen prompting the user 104 to accept the invoice or not accept the invoice. If the user 104 does not accept the invoice, the invoice routine 618 may exit at operation 2208. If the user 104 does accept the invoice, the invoice routine 618 may process payment of the invoice at operation 2210. Processing payment of the invoice may include sending a payment request message to the financial institution system 112 requesting that the invoice be paid to the issuer from an account associated with the user 104. Optionally, at operation 2212, the invoice routine 618 may reconcile the invoice and/or the payment made at operation 2210 with an ERP system associated with the user 104 (e.g, with the user's employer). Reconciling the invoice with the ERP system may include, for example, matching the invoice with a record of goods or services received, as indicated at the ERP system.

Figure 23:
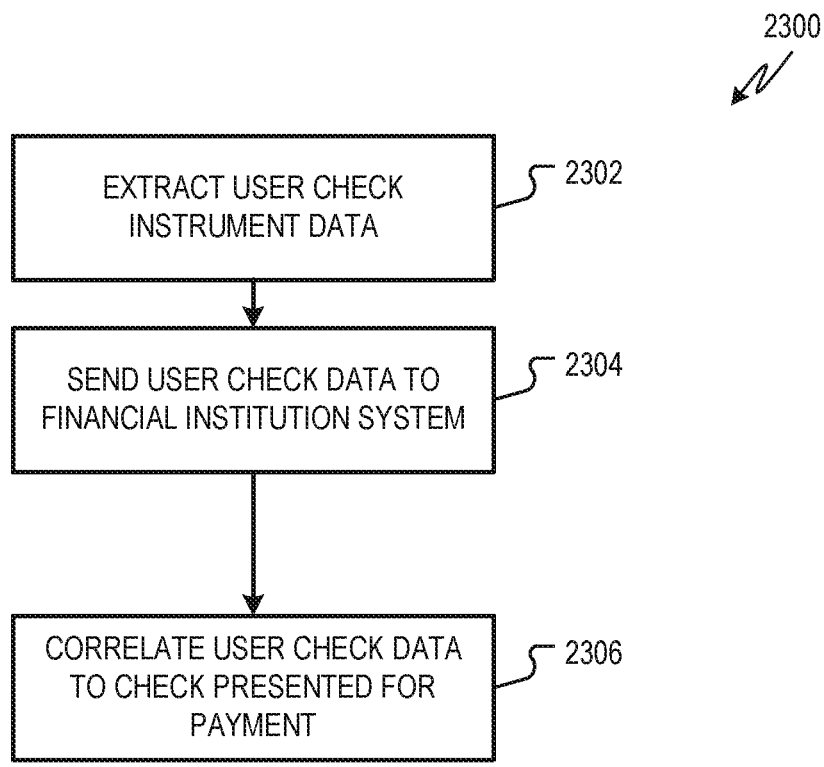
FIG. 23 is a flowchart showing one example of a process flow that may be executed by a check register routine.

FIG. 23 is a flowchart showing one example of a process flow 2300 that may be executed by the check register routine 616. The check register routine 616 may be utilized by a user 104 who writes checks to other parties and wishes to track his or her own checks as those checks are presented for payment. For example, the user 104 may use the document application 106 to capture an image of a user-executed check (e.g., a check where the user 104 or the user's employer or other associated organization is the payor) or of a check register indicating checks written by the user 104. The images may be processed by the financial institution system 112 and used, when the checks are presented for payment, to verify that the checks are properly payable.

The check register routine 616 may launch after the document application 106 has captured an image of the document 108 and identified that the document 108 is a check for which the user 104 or an associated person or entity is the payor, or identified that the document 108 is a check register. At operation 2302, the check register routine 616 may extract user check instrument data from the captured image of the check or check register. The check register routine 616 may do this directly and/or may send the captured image to the financial institution system 112 and/or the image processor application 118. At operation 2304, the check register routine 616 may send the extracted data to the financial institution system 112. In the process flow 2300, operation 2306 may be performed by the check register routine 616 and/or by the financial institution system 112 (e.g., a document-type routine component 114, 116). At operation 2306, the check register and/or check data may be correlated with one or more checks presented for payment. Finding a correlation may indicate that the check presented for payment was, indeed, written by the user 104 and/or a person or entity associated with the user 104.

As described herein, the document application 106 may launch the check deposit routine 614 when it detects a check to be deposited by the user 104. When the document application 106 detects a check written by the user 104 and/or from an account associated with the user 104, it may launch the check register routine 616. The document application 106 (or a component at the financial institution system 112) may distinguish checks written by the user 104 or an associated person or entity from checks payable to the user 104 or an associated person or entity, in any suitable manner. For example, the document application 106 may cross-reference the payor of the check, the account number of the check, the routing number of the check, etc., to payors, account numbers, routing numbers, etc. associated with the user 104.

FIG. 24 is a block diagram showing an example architecture 2400 of a user computing device. The architecture 2400 may, for example, describe any of the computing devices described, such as the user computing device 102. The architecture 2400 comprises a processor unit 2410. The processor unit 2410 may include one or more processors. Any of a variety of different types of commercially available processors suitable for user computing devices may be used (for example, an XScale architecture microprocessor, a Microprocessor without Interlocked Pipeline Stages (MIPS) architecture processor, or another type of processor). A memory 2420, such as a Random Access Memory (RAM), a flash memory, or another type of memory or data storage, is typically accessible to the processor. The memory 2420 may be adapted to store an operating system (OS) 2430, as well as application programs 2440.

The processor unit 2410 may be coupled, either directly or via appropriate intermediary hardware, to a display 2450 and to one or more input/output (I/O) devices 2460, such as a keypad, a touch panel sensor, a microphone, and the like. Such I/O devices 2460 may include a touch sensor for capturing fingerprint data, a camera for capturing one or more images of the user, a retinal scanner, or any other suitable devices. Similarly, in some examples, the processor unit 2410 may be coupled to a transceiver 2470 that interfaces with an antenna 2490. The transceiver 2470 may be configured to both transmit and receive cellular network signals, wireless data signals, or other types of signals via the antenna 2490, depending on the nature of the user computing device implemented by the architecture 2400. Although one transceiver 2470 is shown, in some examples, the architecture 2400 includes additional transceivers. For example, a wireless transceiver may be utilized to communicate according to an IEEE 802.11 specification, such as Wi-Fi and/or a short-range communication medium. Some short-range communication mediums, such as near-field communication (NFC), may utilize a separate, dedicated transceiver. Further, in some configurations, a Global Positioning System (GPS) receiver 2480 may also make use of the antenna 2490 to receive GPS signals. In addition to or instead of the GPS receiver 2480, any suitable location-determining sensor may be included and/or used, including for example, a Wi-Fi positioning system. In some examples, the architecture 2400 (e.g., processor unit 2410) may also support a hardware interrupt. In response to a hardware interrupt, the processor unit 2410 may pause its processing and execute an interrupt service routine (ISR).

FIG. 25 is a block diagram 2500 showing one example of a software architecture 2502 for a computing device. The software architecture 2502 may be used in conjunction with various hardware architectures, for example, as described herein. FIG. 25 is merely a non-limiting example of a software architecture 2502 and many other architectures may be implemented to facilitate the functionality described herein. A representative hardware layer 2504 is illustrated and can represent, for example, any of the above-referenced computing devices. In some examples, the hardware layer 2504 may be implemented according to the architecture 2600 of FIG. 26 and/or the architecture 2400 of FIG. 24.

The representative hardware layer 2504 comprises one or more processing units 2506 having associated executable instructions 2508. The executable instructions 2508 represent the executable instructions of the software architecture 2502, including implementation of the methods, modules, components, and so forth of FIGS. 1-24. The hardware layer 2504 also includes memory and/or storage modules 2510, which also have the executable instructions 2508. The hardware layer 2504 may also comprise other hardware 2512, which represents any other hardware of the hardware layer 2504, such as the other hardware illustrated as part of the architecture 2600.

In the example architecture of FIG. 25, the software architecture 2502 may be conceptualized as a stack of layers where each layer provides particular functionality. For example, the software architecture 2502 may include layers such as an operating system 2514, libraries 2516, frameworks/middleware 2518, applications 2520, and a presentation layer 2544. Operationally, the applications 2520 and/or other components within the layers may invoke application programming interface (API) calls 2524 through the software stack and receive a response, returned values, and so forth illustrated as messages 2526 in response to the API calls 2524. The layers illustrated are representative in nature and not all software architectures have all layers. For example, some mobile or special-purpose operating systems may not provide a frameworks/middleware 2518 layer, while others may provide such a layer. Other software architectures may include additional or different layers.

The operating system 2514 may manage hardware resources and provide common services. The operating system 2514 may include, for example, a kernel 2528, services 2530, and drivers 2532. The kernel 2528 may act as an abstraction layer between the hardware and the other software layers. For example, the kernel 2528 may be responsible for memory management, processor management (e.g., scheduling), component management, networking, security settings, and so on. The services 2530 may provide other common services for the other software layers. In some examples, the services 2530 include an interrupt service. The interrupt service may detect the receipt of a hardware or software interrupt and, in response, cause the software architecture 2502 to pause its current processing and execute an ISR when an interrupt is received. The ISR may generate the alert.

The drivers 2532 may be responsible for controlling or interfacing with the underlying hardware. For instance, the drivers 2532 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 2516 may provide a common infrastructure that may be utilized by the applications 2520 and/or other components and/or layers. The libraries 2516 typically provide functionality that allows other software modules to perform tasks in an easier fashion than by interfacing directly with the underlying operating system 2514 functionality (e.g., kernel 2528, services 2530, and/or drivers 2532). The libraries 2516 may include system libraries 2534 (e.g., C standard library) that may provide functions such as memory allocation functions, string manipulation functions, mathematic functions, and the like. In addition, the libraries 2516 may include API libraries 2536 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 9D in a graphic content on a display), database libraries (e.g., SQLite that may provide various relational database functions), web libraries (e.g., WebKit that may provide web browsing functionality), and the like. The libraries 2516 may also include a wide variety of other libraries 2538 to provide many other APIs to the applications 2520 and other software components/modules.

The frameworks 2518 (also sometimes referred to as middleware) may provide a higher-level common infrastructure that may be utilized by the applications 2520 and/or other software components/modules. For example, the frameworks 2518 may provide various GUI functions, high-level resource management, high-level location services, and so forth. The frameworks 2518 may provide a broad spectrum of other APIs that may be utilized by the applications 2520 and/or other software components/modules, some of which may be specific to a particular operating system or platform.

The applications 2520 include built-in applications 2540 and/or third-party applications 2542. Examples of representative built-in applications 2540 may include, but are not limited to, a contacts application, a browser application, a book reader application, a location application, a media application, a messaging application, and/or a game application. The third-party applications 2542 may include any of the built-in applications 2540 as well as a broad assortment of other applications. In a specific example, the third-party application 2542 (e.g., an application developed using the Android™ or iOS™ software development kit (SDK) by an entity other than the vendor of the particular platform) may be mobile software running on a mobile operating system such as iOS™, Android™, Windows® Phone, or other user computing device operating systems. In this example, the third-party application 2542 may invoke the API calls 2524 provided by the mobile operating system such as the operating system 2514 to facilitate functionality described herein.

The applications 2520 may utilize built-in operating system functions (e.g., kernel 2528, services 2530, and/or drivers 2532), libraries (e.g., system libraries 2534, API libraries 2536, and other libraries 2538), or frameworks/middleware 2518 to create user interfaces to interact with users of the system. Alternatively, or additionally, in some systems, interactions with a user may occur through a presentation layer, such as the presentation layer 2544. In these systems, the application/module "logic" can be separated from the aspects of the application/module that interact with a user.

Some software architectures utilize virtual machines. For example, systems described herein may be executed utilizing one or more virtual machines executed at one or more server computing machines. In the example of FIG. 25, this is illustrated by a virtual machine 2548. A virtual machine creates a software environment where applications/modules can execute as if they were executing on a hardware computing device. A virtual machine is hosted by a host operating system (e.g., operating system 2514) and typically, although not always, has a virtual machine monitor 2546, which manages the operation of the virtual machine 2548 as well as the interface with the host operating system (e.g., operating system 2514). A software architecture executes within the virtual machine 2548, such as an operating system 2550, libraries 2552, frameworks/middleware 2554, applications 2556, and/or a presentation layer 2558. These layers of software architecture executing within the virtual machine 2548 can be the same as corresponding layers previously described or may be different.

FIG. 26 is a block diagram illustrating a computing device hardware architecture 2600, within which a set or sequence of instructions can be executed to cause a machine to perform examples of any one of the methodologies discussed herein. For example, the architecture 2600 may execute the software architecture 2502 described with respect to FIG. 25. The architecture 2600 may operate as a standalone device or may be connected (e.g, networked) to other machines. In a networked deployment, the architecture 2600 may operate in the capacity of either a server or a client machine in server-client network environments, or it may act as a peer machine in peer-to-peer (or distributed) network environments. The architecture 2600 can be implemented in a personal computer (PC), a tablet PC, a hybrid tablet, a set-top box (STB), a personal digital assistant (PDA), a mobile telephone, a web appliance, a network router, a network switch, a network bridge, or any machine capable of executing instructions (sequential or otherwise) that specify operations to be taken by that machine.

The example architecture 2600 includes a processor unit 2602 comprising at least one processor (e.g., a central processing unit (CPU), a graphics processing unit (GPU), or both, processor cores, compute nodes, etc.). The architecture 2600 may further comprise a main memory 2604 and a static memory 2606, which communicate with each other via a link 2608 (e.g., bus). The architecture 2600 can further include a video display unit 2610, an alphanumeric input device 2612 (e.g, a keyboard), and a UI navigation device 2614 (e.g, a mouse). In some examples, the video display unit 2610, alphanumeric input device 2612, and UI navigation device 2614 are incorporated into a touchscreen display. The architecture 2600 may additionally include a storage device 2616 (e.g, a drive unit), a signal generation device 2618 (e.g., a speaker), a network interface device 2620, and one or more sensors (not shown), such as a GPS sensor, compass, accelerometer, or other sensor.

In some examples, the processor unit 2602 or other suitable hardware component may support a hardware interrupt. In response to a hardware interrupt, the processor unit 2602 may pause its processing and execute an ISR, for example, as described herein.

The storage device 2616 includes a machine-readable medium 2622 on which is stored one or more sets of data structures and instructions 2624 (e.g, software) embodying or utilized by any one or more of the methodologies or functions described herein. The instructions 2624 can also reside, completely or at least partially, within the main memory 2604, within the static memory 2606, and/or within the processor unit 2602 during execution thereof by the architecture 2600, with the main memory 2604, the static memory 2606, and the processor unit 2602 also constituting machine-readable media. Instructions 2624 stored at the machine-readable medium 2622 may include, for example, instructions for implementing the software architecture 2502, instructions for executing any of the features described herein, etc.

While the machine-readable medium 2622 is illustrated in an example to be a single medium, the term "machine-readable medium" can include a single medium or multiple media (e.g., a centralized or distributed database, and/or associated caches and servers) that store the one or more instructions 2624. The term "machine-readable medium" shall also betaken to include any tangible medium that is capable of storing encoding or carrying instructions for execution by the machine and that cause the machine to perform any one or more of the methodologies of the present disclosure, or that is capable of storing encoding or carrying data structures utilized by or associated with such instructions. The term "machine-readable medium" shall accordingly betaken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 2624 can further be transmitted or received over a communications network 2626 using a transmission medium via the network interface device 2620 utilizing any one of a number of well-known transfer protocols (e.g., hypertext transfer protocol (HTTP)). Examples of communication networks include a LAN, a WAN, the Internet, mobile telephone networks, plain old telephone (POTS) networks, and wireless data networks (e.g., Wi-Fi, 3G, and 5G LTE/LTE-A or WiMAX networks). The term "transmission medium" shall be taken to include any intangible medium that is capable of storing encoding or carrying instructions for execution by the machine, and includes digital or analog communications signals or other intangible media to facilitate communication of such software.

Various components are described in the present disclosure as being configured in a particular way. A component may be configured in any suitable manner. For example, a component that is or that includes a computing device may be configured with suitable software instructions that program the computing device. A component may also be configured by virtue of its hardware arrangement or in any other suitable manner.

The above description is intended to be illustrative, and not restrictive. For example, the above-described examples (or one or more aspects thereof) can be used in combination with others. Other embodiments can be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims.

Also, in the above Detailed Description, various features can be grouped together to streamline the disclosure. However, the claims cannot set forth every feature disclosed herein as embodiments can feature a subset of said features. Further, embodiments can include fewer features than those disclosed in a particular example. Thus, the following claims are hereby incorporated into the Detailed Description, with each claim standing on its own as a separate embodiment. The scope of the embodiments disclosed herein is to be determined with reference to the appended claims, along with the full scope of equivalents to which such claims are entitled.

What is claimed is:

1. A system for facilitating image-based financial transactions, comprising:
    a computing device comprising a processor unit; an imaging device; and
    a display, wherein the processor unit is programmed to perform actions comprising:
        displaying at the display a multi-mode launch icon, wherein the launch icon is alternately selectable by a user of the computing device in a first mode and in a second mode;
        detecting a first user input that selects the launch icon in the first mode;
        in response to the first user input, executing a first application at the computing device;
        detecting a second user input that selects the launch icon in the second mode;
        in response to the second user input, prompting the user to capture an image of a document with the imaging device;
        receiving, from the imaging device, the image of the document;
        determining, based at least in part on the image, that the document is of a first document type; and
        executing a document-type routine to perform a first financial transaction based at least in part on the document.

2. The system of claim 1, wherein detecting the second user input that selects the launch icon in the second mode comprises detecting that the user has selected the launch icon continuously for a time that is greater than a threshold time.

3. The system of claim 1, wherein detecting the second user input that selects the launch icon in the second mode comprises detecting that the user has touched a position of the launch icon on the display with a force that is greater than a threshold force.

4. The system of claim 1, wherein detecting the second user input that selects the launch icon in the second mode comprises:
    detecting that the launch icon has been selected;
    displaying a menu comprising a menu item corresponding to the second mode; and
    detecting that the menu item has been selected.

5. The system of claim 1, wherein the first document type is a check, and wherein executing the document-type routine comprises:
    prompting the user to capture a second image showing a second side of the document; and
    sending to a financial institution system a deposit request indicating an amount of the check to be deposited at an account associated with the user.

6. The system of claim 1, wherein the first document type is a receipt, and wherein executing the document-type routine comprises:
    determining a purchase amount indicated by the receipt;
    correlating the purchase amount to a debit at an account associated with the user; and
    storing a correlation between the receipt and the debit.

7. The system of claim 6, wherein executing the document-type routine further comprises:
    displaying, at the display, an indication of the purchase amount and an indication of the debit; and
    before storing the correlation between the receipt and the debit, receiving from the user an approval of the correlation.

8. The system of claim 1, wherein the first document type is an invoice, and wherein executing the document-type routine comprises:
    determining an invoice amount associated with the invoice based at least in part on the invoice;
    determining a payee associated with the invoice;
    displaying an indication of the invoice amount at the display;
    receiving an indication of user acceptance of the invoice amount; and
    sending to a financial institution system a payment request message requesting payment of the invoice amount from an account associated with the user to the payee.

9. The system of claim 1, wherein the first document type is a user check, and wherein executing the document-type routine comprises sending data describing the user check to a financial institution system.

10. A method for facilitating image-based financial transactions, comprising:
- displaying, by a computing device and at a display of the computing device, a multi-mode launch icon, wherein the launch icon is alternately selectable by a user of the computing device in a first mode and in a second mode;
- detecting, by the computing device, a first user input that selects the launch icon in the first mode;
- in response to the first user input, executing a first application at the computing device;
- detecting, by the computing device, a second user input that selects the launch icon in the second mode;
- in response to the second user input, prompting the user, by the computing device, to capture an image of a document with an imaging device;
- receiving, by the computing device and from the imaging device, the image of the document;
- determining, based at least in part on the image, that the document is of a first document type; and
- executing, by the computing device, a document-type routine to perform a first financial transaction based at least in part on the document.

11. The method of claim 10, wherein detecting the second user input that selects the launch icon in the second mode comprises detecting that the user has selected the launch icon continuously for a time that is greater than a threshold time.

12. The method of claim 10, wherein detecting the second user input that selects the launch icon in the second mode comprises detecting that the user has touched a position of the launch icon on the display with a force that is greater than a threshold force.

13. The method of claim 10, wherein detecting the second user input that selects the launch icon in the second mode comprises:
- detecting that the launch icon has been selected;
- displaying a menu comprising a menu item corresponding to the second mode; and
- detecting that the menu item has been selected.

14. The method of claim 10, wherein the first document type is a check, and wherein executing the document-type routine comprises:
- prompting the user to capture a second image showing a second side of the document; and
- sending to a financial institution system a deposit request indicating an amount of the check to be deposited at an account associated with the user.

15. The method of claim 10, wherein the first document type is a receipt, and wherein executing the document-type routine comprises:
- determining a purchase amount indicated by the receipt;
- correlating the purchase amount to a debit at an account associated with the user; and
- storing a correlation between the receipt and the debit.

16. The method of claim 15, wherein executing the document-type routine further comprises:
- displaying, at the display, an indication of the purchase amount and an indication of the debit; and
- before storing the correlation between the receipt and the debit, receiving from the user an approval of the correlation.

17. The method of claim 10, wherein the first document type is an invoice, and wherein executing the document-type routine comprises:
- determining an invoice amount associated with the invoice based at least in part on the invoice;
- determining a payee associated with the invoice;
- displaying an indication of the invoice amount at the display;
- receiving an indication of user acceptance of the invoice amount; and
- sending to a financial institution system a payment request message requesting payment of the invoice amount from an account associated with the user to the payee.

18. The method of claim 10, wherein the first document type is a user check, and wherein executing the document-type routine comprises sending data describing the user check to a financial institution system.

19. A machine-readable medium comprising thereon instructions that, when executed by a computing device, cause the computing device to perform operations comprising:
- displaying, at a display of the computing device, a multi-mode launch icon, wherein the launch icon is alternately selectable by a user of the computing device in a first mode and in a second mode;
- detecting a first user input that selects the launch icon in the first mode;
- in response to the first user input, executing a first application at the computing device;
- detecting a second user input that selects the launch icon in the second mode;
- in response to the second user input, prompting the user, by the computing device, to capture an image of a document with an imaging device;
- receiving, from the imaging device, the image of the document;
- determining, based at least in part on the image, that the document is of a first document type; and
- executing a document-type routine to perform a first financial transaction based at least in part on the document.

20. The machine-readable medium of claim 19, wherein detecting the second user input that selects the launch icon in the second mode comprises detecting that the user has selected the launch icon continuously for a time that is greater than a threshold time.

* * * * *